(12) United States Patent
Lim

(10) Patent No.: US 11,442,573 B2
(45) Date of Patent: Sep. 13, 2022

(54) DISPLAY DEVICE AND DRIVING METHOD THEREOF

(71) Applicant: Samsung Display Co., Ltd., Yongin-si (KR)

(72) Inventor: Sang Hyun Lim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/367,417

(22) Filed: Jul. 5, 2021

(65) Prior Publication Data

US 2022/0129129 A1 Apr. 28, 2022

(30) Foreign Application Priority Data

Oct. 27, 2020 (KR) .......................... 10-2020-0140669

(51) Int. Cl.
*G06F 3/041* (2006.01)

(52) U.S. Cl.
CPC ...... *G06F 3/04162* (2019.05); *G06F 3/04184* (2019.05)

(58) Field of Classification Search
CPC .. G06F 3/04162; G06F 3/0441; G06F 3/0442; G06F 3/03545; G06F 3/04184; G06F 3/04182
See application file for complete search history.

(56) References Cited

U.S. PATENT DOCUMENTS

| | | | |
|---|---|---|---|
| 10,739,909 B1* | 8/2020 | Lin | G09G 5/003 |
| 10,838,546 B2 | 11/2020 | Choi | |
| 10,955,963 B2 | 3/2021 | Choi et al. | |
| 10,955,964 B2 | 3/2021 | Jung et al. | |
| 2018/0113523 A1* | 4/2018 | Hara | G06F 3/0446 |
| 2019/0171320 A1* | 6/2019 | Kim | G06F 3/03545 |
| 2020/0036386 A1 | 1/2020 | Choi | |
| 2020/0073530 A1 | 3/2020 | Kim et al. | |

FOREIGN PATENT DOCUMENTS

| | | |
|---|---|---|
| KR | 10-2020-0009453 | 1/2020 |
| KR | 10-2020-0013319 | 2/2020 |
| KR | 10-2020-0018074 | 2/2020 |
| KR | 10-2020-0077344 | 6/2020 |

* cited by examiner

*Primary Examiner* — Koosha Sharifi-Tafreshi
(74) *Attorney, Agent, or Firm* — H.C. Park & Associates, PLC

(57) ABSTRACT

A display device includes a display part and a sensor part overlapping the display part. During a first period, sensors in a first area of the sensor part are configured to transmit a first uplink signal. During the first period, sensors in a second area of the sensor part are configured to transmit a first inversion signal with respect to the first uplink signal. During a second period after the first period, sensors in a third area of the sensor part are configured to transmit a second uplink signal. During the second period, sensors in a fourth area of the sensor part are configured to transmit a second inversion signal with respect to the second uplink signal. The first area at least partially overlaps the fourth area. The second area at least partially overlaps the third area.

20 Claims, 25 Drawing Sheets

<t1b~t2b>

<t5b~t6b>

FIG. 17
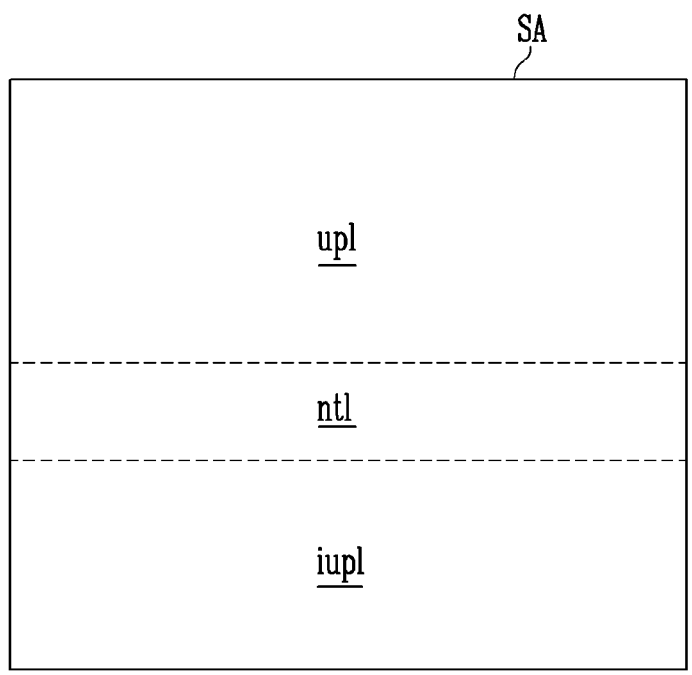
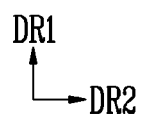

DISPLAY DEVICE AND DRIVING METHOD THEREOF

CROSS-REFERENCE TO RELATED APPLICATIONS

This application claims priority to and the benefit of Korean Patent Application No. 10-2020-0140669, filed Oct. 27, 2020, which is hereby incorporated by reference for all purposes as if fully set forth herein.

BACKGROUND

Field

Embodiments generally relates to a display device and a driving method thereof.

Discussion

As information technology has developed, the importance of a display device, which is a connection medium between a user and information, has been highlighted. As such, the use of display devices, such as a liquid crystal display device, an organic light emitting display device, and the like, has been increasing. The display device may include a pixel part for displaying an image and a sensing part for sensing a user's input. The sensing part may be disposed to overlap the pixel part. The user's input may be made not only through a touch interaction, but also through an electronic device, such as an active pen, e.g., a stylus. In this case, the display device may periodically transmit an uplink signal to communicate with the active pen. Since such an uplink signal may interfere with signals for displaying an image in a display device, display quality may be deteriorated.

The above information disclosed in this section is only for understanding the background of the inventive concepts, and, therefore, may contain information that does not form prior art.

SUMMARY

Some aspects provide a display device capable of preventing deterioration of display quality caused, at least in part, by transmission of an uplink signal.

Some aspects provide a method of driving a display device capable of preventing deterioration of display quality caused, at least in part, by transmission of an uplink signal.

Additional aspects will be set forth in the detailed description which follows, and, in part, will be apparent from the disclosure, or may be learned by practice of the inventive concepts.

According to an embodiment, a display device includes a display part and a sensor part overlapping the display part. During a first period, sensors in a first area of the sensor part are configured to transmit a first uplink signal. During the first period, sensors in a second area of the sensor part are configured to transmit a first inversion signal with respect to the first uplink signal. During a second period after the first period, sensors in a third area of the sensor part are configured to transmit a second uplink signal. During the second period, sensors in a fourth area of the sensor part are configured to transmit a second inversion signal with respect to the second uplink signal. The first area at least partially overlaps the fourth area. The second area at least partially overlaps the third area.

According to an embodiment a method of driving a display device including a display part and a sensor part overlapping the display part includes, during the first period: transmitting, by sensors in a first area of the sensor part, a first uplink signal; and transmitting, by sensors in a second area of the sensor part, a first inversion signal with respect to the first uplink signal. The method further includes, in response to an acknowledgment signal for the first uplink signal not being received, during a second period after the first period: transmitting, by sensors in a third area of the sensor part, a second uplink signal; and transmitting, by sensors in a fourth area of the sensor part, a second inversion signal with respect to the second uplink signal. The first area at least partially overlaps the fourth area. The second area at least partially overlaps the third area.

The foregoing general description and the following detailed description are illustrative and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate embodiments of the inventive concepts, and, together with the description, serve to explain principles of the inventive concepts. In the drawings:

FIGS. 17, 18, and 19 illustrate schematic views in which areas of a sensing part are variously set according to some embodiments;

DETAILED DESCRIPTION OF SOME EMBODIMENTS

Figure 1:
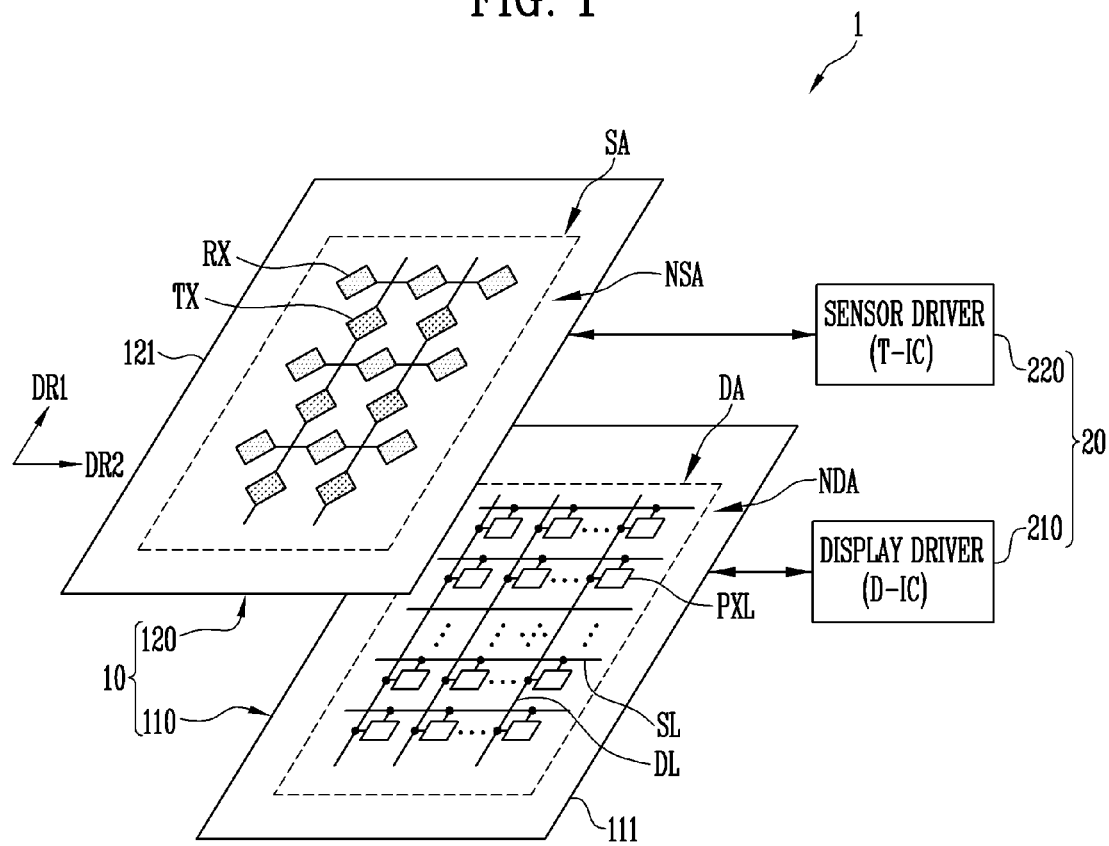
FIG. 1 illustrates a schematic view of a display device according to an embodiment.

In the following description, for the purposes of explanation, numerous specific details are set forth to provide a thorough understanding of various embodiments. As used herein, the terms "embodiments" and "implementations" may be used interchangeably and are non-limiting examples employing one or more of the inventive concepts disclosed herein. It is apparent, however, that various embodiments may be practiced without these specific details or with one or more equivalent arrangements. In other instances, wellknown structures and devices are shown in block diagram form to avoid unnecessarily obscuring various embodiments. Further, various embodiments may be different, but do not have to be exclusive. For example, specific shapes, configurations, and characteristics of an embodiment may be used or implemented in another embodiment without departing from the inventive concepts.

Unless otherwise specified, the illustrated embodiments are to be understood as providing example features of varying detail of some embodiments. Therefore, unless otherwise specified, the features, components, modules, layers, films, panels, regions, aspects, etc. (hereinafter individually or collectively referred to as an "element" or "elements"), of the various illustrations may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, electrical, and/or fluid connection. In addition, the DR1-axis, the DR2-axis, and the DR3-axis are not limited to three axes of a rectangular coordinate system, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one element's relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing some embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art. In this manner, the expression or phrase "equal to or the same as" may mean "substantially equal to or the same as" such that minor differences may be excused.

Various embodiments may be described herein with reference to sectional views, isometric views, perspective views, plan views, and/or exploded illustrations that are schematic illustrations of idealized embodiments and/or intermediate structures. As such, variations from the shapes of the illustrations as a result of, for example, manufacturing techniques and/or tolerances, are to be expected. Thus, embodiments disclosed herein should not be construed as limited to the particular illustrated shapes of regions, but are to include deviations in shapes that result from, for instance, manufacturing. To this end, regions illustrated in the drawings may be schematic in nature and shapes of these regions may not reflect the actual shapes of regions of a device, and, as such, are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the inventive concepts. Further, the blocks, units, and/or modules of some embodiments may be physically combined into more complex blocks, units, and/or modules without departing from the inventive concepts.

Hereinafter, various embodiments will be explained in detail with reference to the accompanying drawings.

FIG. 1 illustrates a schematic view of a display device according to an embodiment.

Referring to FIG. 1, a display device 1 according to an embodiment may include a panel 10 and a driving circuit part 20 for driving the panel 10.

For example, the panel 10 may include a display part 110 for displaying an image and a sensor part 120 for sensing various interactions, such as a touch, a pressure, a fingerprint, a hovering, an approach, and an active pen. The sensor part 120 may overlap the display part 110. For example, the panel 10 may include pixels PXL, as well as include first sensors TX and second sensors RX that overlap at least some of the pixels PXL. The driving circuit part 20 may include a display driver 210 for driving the display part 110 and a sensor driver 220 for driving the sensor part 120.

In some embodiments, the display part 110 and the sensor part 120 may be separately manufactured from each other, and then may be disposed and/or be combined so that at least one area thereof overlap each other. Alternatively, in an embodiment, the display part 110 and the sensor part 120 may be integrally manufactured. For example, the sensor part 120 may be formed directly on at least one substrate (for example, an upper and/or lower substrate of a display panel, or a thin film encapsulation layer of a display panel) forming the display part 110 or other insulation layers or various functional films (for example, an optical layer or a passivation layer).

As seen in FIG. 1, the sensor part 120 is shown as being disposed on a front surface (for example, an upper surface on which an image is displayed) of the display part 110, but the position of the sensor part 120 is not limited thereto. For example, in an embodiment, the sensor part 120 may be disposed on a rear surface or respective surfaces of the display part 110. In some embodiments, the sensor part 120 may be disposed on at least one edge region of the display part 110.

The display part 110 may include a display substrate 111 and a plurality of pixels PXL formed on the display substrate 111. The pixels PXL may be disposed in a display area DA of the display substrate 111.

The display substrate 111 may include the display area DA in which an image is displayed and a non-display area NDA outside the display area DA. In some embodiments, the display area DA may be disposed in a central area of the display part 110, and the non-display area NDA may be disposed in an edge area of the display part 110 to surround (or partially surround) the display area DA.

The display substrate 111 may be at least one of a rigid substrate and a flexible substrate. Material(s) and/or physical properties of the display substrate 111 are not particularly limited. For example, the display substrate 111 may be a rigid substrate made of glass or tempered glass, or a flexible substrate formed of a thin film made of plastic or a metallic material.

In the display area DA, scan lines SL and data lines DL, and the pixels PXL connected to the scan lines SL and the data lines DL are disposed. The pixels PXL are selected by a scan signal of a turn-on level supplied from the scan lines SL to receive a data voltage from the data lines DL, and emit light with luminance corresponding to the data voltage. In this manner, an image corresponding to the data voltage is displayed in the display area DA. The structure and driving method of the pixels PXL are not particularly limited. For example, respective pixels PXL may be implemented as pixels having various structures and/or and various driving methods.

In the non-display area NDA, various wires connected to the pixels PXL of the display area DA and/or internal circuit parts may be disposed. For example, in the non-display area NDA, a plurality of wires for supplying various power sources and control signals to the display area DA may be disposed, and in addition, a scan driver and/or the like may be further disposed.

The type of the display part 110 is not particularly limited. For example, the display part 110 may be implemented as a self-light emitting type display panel, such as an organic light emitting display panel. Alternatively, the display part 110 may be implemented as a non-self-light emitting type display panel, such as a liquid crystal display panel. When the display part 110 is implemented in a non-self-light emitting type, the display device 1 may additionally include a light source, such as a backlight unit.

The sensor part 120 includes a sensor substrate 121 and a plurality of sensors TX and RX formed on the sensor substrate 121. The sensors TX and RX may be disposed in a sensing area SA on the sensor substrate 121.

The sensor substrate 121 may include the sensing area SA capable of sensing a touch input and/or the like, and a peripheral area NSA outside the sensing area SA. In some embodiments, the sensing area SA may overlap at least one area of the display area DA. For example, the sensing area SA may be set as an area corresponding to the display area DA (for example, an area overlapping the display area DA), and the peripheral area NSA may be set as an area corresponding to the non-display area NDA (for example, an area overlapping the non-display area NDA). In this case, when a touch input or the like is provided on the display area DA, it is possible to detect the touch input through the sensor part 120.

The sensor substrate 121 may be at least one of a rigid substrate and a flexible substrate, and may be configured including at least one insulation layer. In addition, the sensor substrate 121 may be a transparent or translucent transmissive substrate, but is not limited thereto. Accordingly, the material(s) and physical properties of the sensor substrate 121 are not particularly limited. For example, the sensor substrate 121 may be a rigid substrate made of glass or tempered glass, or a flexible substrate formed of a thin film made of plastic or a metallic material. In addition, in some embodiments, at least one substrate forming the display part 110 (for example, the display substrate 111, an encapsulation substrate, and/or a thin film encapsulation layer), or at least one layer of insulation film or functional film disposed on an inner and/or outer surface of the display part 110, may be used as the sensor substrate 121.

The sensing area SA is set as an area capable of reacting to a user input (that is, an active area of a sensor). To this end, the sensors TX and RX for sensing the user input or the like may be disposed in the sensing area SA. In some embodiments, the sensors TX and RX may include the first sensors TX and the second sensors RX.

According to some embodiments, respective first sensors TX may extend in a first direction DR1. The first sensors TX may be arranged in a second direction DR2. The second direction DR2 may be different from the first direction DR1. For example, the second direction DR2 may be a direction orthogonal to the first direction DR1. A third direction DR3 may be orthogonal to the first direction DR1 and the second direction DR3. In an embodiment, the extension direction and arrangement direction of the first sensors TX may follow other configurations. Each of the first sensors TX may have a structure in which first cells having a relatively large area and first bridges having a relatively narrow area are connected to each other. In FIG. 1, each first cell is illustrated in a diamond shape, but may be configured in various shapes, such as at least one of a circle, a quadrangle, a triangle, and a mesh form. For example, the first bridges may be integrally formed on the same layer as the first cells. In an embodiment, the first bridges may be formed in a different layer from the first cells to electrically connect adjacent first cells.

Each second sensor RX may extend in the second direction DR2. The second sensors RX may be arranged in the first direction DR1. In an embodiment, the extension direction and arrangement direction of the second sensors RX may follow other configurations. Each second sensor RX may have a structure in which second cells having a relatively large area and second bridges having a relatively narrow area are connected to each other. In FIG. 1, each second cell is illustrated in a diamond shape, but may be configured in various shapes, such as at least one of a circle, a quadrangle, a triangle, and a mesh form. For example, the second bridges may be integrally formed on the same layer as the second cells. In an embodiment, the second bridges may be formed in a different layer from the second cells to electrically connect adjacent second cells.

In some embodiments, each of the first sensors TX and the second sensors RX may have conductivity by including at least one of a metallic material, a transparent conductive material, and various other conductive materials. For example, the first sensors TX and the second sensors RX may include at least one of various metallic materials, such as gold (Au), silver (Ag), aluminum (Al), molybdenum (Mo), chromium (Cr), titanium (Ti), nickel (Ni), neodymium (Nd), copper (Cu), and platinum (Pt), or an alloy thereof. In this case, the first sensors TX and the second sensors RX may be configured in a mesh form. In addition, the first sensors TX and the second sensors RX may include at least one of various transparent conductive materials, such as a silver nanowire (AgNW), an indium tin oxide (ITO), an indium zinc oxide (IZO), an indium gallium zinc oxide (IGZO), an antimony zinc oxide (AZO), an indium tin zinc oxide (ITZO), a zinc oxide (ZnO), a tin oxide (SnO2), a carbon nano tube, and a graphene. In addition, the first sensors TX and the second sensors RX may have conductivity by including at least one of various conductive materials. In addition, each of the first sensors TX and the second sensors RX may be made of a single layer or multilayer structure, and the cross-sectional structure thereof is not particularly limited.

In the peripheral area NSA of the sensor part 120, sensor lines for electrically connecting the sensors TX and RX to the sensor driver 220 and the like may be disposed.

The driving circuit part 20 may include the display driver 210 for driving the display part 110 and the sensor driver 220 for driving the sensor part 120. In an embodiment, the display driver 210 and the sensor driver 220 may be configured of separate integrated circuit (IC) chips (or other structures) from each other. In an embodiment, at least a portion of the display driver 210 and the sensor driver 220 may be integrated together in one IC chip.

The display driver 210 is electrically connected to the display part 110 to drive the pixels PXL. For example, the display driver 210 may include a data driver 12 and a timing controller 11 (see FIG. 2). A scan driver 13 may be separately mounted in the non-display area NDA of the display part 110 (see FIG. 2). In an embodiment, the display driver 210 may include all or at least some of the data driver 12, the timing controller 11, and the scan driver 13.

The sensor driver 220 is electrically connected to the sensor part 120 to drive the sensor part 120. The sensor driver 220 may include a sensor transmitter and a sensor receiver. In some embodiments, the sensor transmitter and the sensor receiver may be integrated into one IC chip, but embodiments are not limited thereto.

Figure 2:
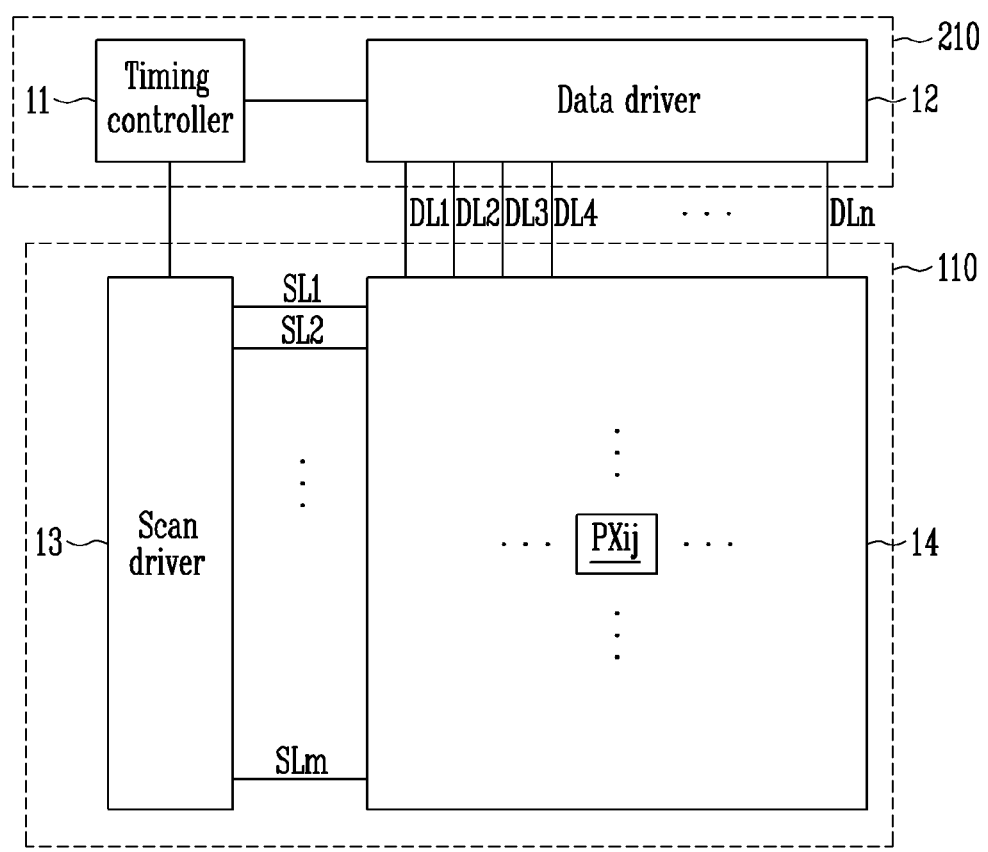
FIG. 2 illustrates a schematic view of a display part and a display driver according to an embodiment.

FIG. 2 illustrates a schematic view of a display part and a display driver according to an embodiment.

Referring to FIG. 2, the display driver 210 may include the data driver 12 and the timing controller 11, and the display part 110 may include the scan driver 13. However, as described above, whether respective functional parts are to be integrated into one IC or into a plurality of ICs, or to be mounted on the display substrate 111 may be variously configured according to specifications of the display device 1.

The timing controller 11 may receive grays and control signals for each frame from a processor. Here, the processor may correspond to a graphics processing unit (GPU), a central processing unit (CPU), an application processor (AP), and/or the like. The control signals may include a vertical synchronization signal, a horizontal synchronization signal, a data enable signal, and/or the like.

Each cycle of the vertical synchronization signal may correspond to each display frame period. For example, when the vertical synchronization signal is at a logic high level, it may indicate an active period of a corresponding display frame period, and when it is at a logic low level, it may indicate a blank period of a corresponding display frame period. Respective cycles of the horizontal synchronization signal may correspond to respective horizontal periods. The data enable signal may be at an enable level (for example, logic high level) while grays are supplied from the processor, and may be at a disable level (for example, logic low level) while grays is not supplied.

The timing controller 11 may render grays to correspond to the specifications of the display device 1. For example, the processor may provide a red gray, a green gray, and a blue gray for each unit dot. For example, when a pixel part 14 has an RGB stripe structure, a pixel PXL may correspond to each gray one to one. In this case, rendering of grays may not be necessary. However, for example, when the pixel part 14 has a pentile structure, since adjacent unit dots share a pixel PXL, the pixel PXL may not correspond to each gray one to one. In this case, rendering of grays may be performed.

Rendered or non-rendered grays may be provided to the data driver 12. In addition, the timing controller 11 may provide a data control signal to the data driver 12. Further, the timing controller 11 may provide a scan control signal to the scan driver 13.

The data driver 12 may generate data voltages to be provided to data lines DL1, DL2, DL3, DL4, ..., and DLn (hereinafter, referred to as data lines DL1, DL2, DL3, and DL4), using the grays and the data control signals received from the timing controller 11.

The scan driver 13 may use a clock signal, a scan start signal, and/or the like received from the timing controller 11 to generate scan signals to be provided to scan lines SL1, SL2, ..., and SLm (hereinafter, referred to as scan lines SL1 and SL2). The scan driver 13 may sequentially supply scan signals having a turn-on level pulse to the scan lines SL1 and SL2. For example, the scan driver 13 may supply the scan signals of a turn-on level to the scan lines SL1 and SL2 at a cycle corresponding to a cycle of the horizontal synchronization signal. The scan driver 13 may include scan stages configured in a form of a shift register. The scan driver 13 may generate the scan signals through a method of sequentially transmitting a scan start signal, which is a pulse type of a turn-on level, to a next scan stage according to control of the clock signal.

The pixel part 14 includes pixels PXL. Respective pixels may be connected to a corresponding data line among the data lines DL1, DL2, DL3, and DL4 and scan line among the scan lines SL1 and SL2. For example, a pixel PXij may be connected to an i-th scan line among the scan lines SL1 and SL2 and a j-th data line among the data lines DL1, DL2, DL3, and DL4. The pixels may include pixels that emit first color light, pixels that emit second color light, and pixels that emit third color light. The first color, the second color, and the third color may be different colors. For example, the first color may be one color of red, green, and blue, the second color may be one color of red, green, and blue excluding the first color, and the third color may be the remaining color of red, green, blue excluding the first and second colors. In addition, magenta, cyan, and yellow may be used instead of red, green, and blue as the first to third colors. It is also contemplated that one or more additional colors may be utilized, such as a white color, etc. However, for the purposes of this disclosure, for better understanding and ease of description, it is described that the first color, second color, and third color are red, green, and blue, respectively.

Figure 3:
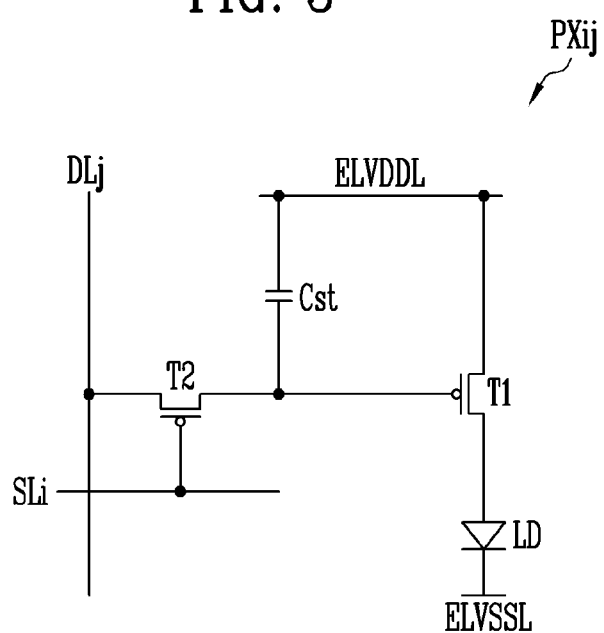
FIG. 3 illustrates a schematic view of a pixel according to an embodiment.

FIG. 3 illustrates a schematic view of a pixel according to an embodiment.

Referring to FIG. 3, the pixel PXij is shown as an example. Since other pixels may also have a substantially equivalent configuration, duplicate descriptions will be omitted.

A gate electrode of a transistor T1 may be connected to a second electrode of a storage capacitor Cst, a first electrode thereof may be connected to a first power line ELVDDL, and a second electrode thereof may be connected to an anode of a light emitting diode LD. The transistor T1 may be referred to as a driving transistor.

A gate electrode of a transistor T2 may be connected to an i-th scan line SLi, a first electrode thereof may be connected to a j-th data line DLj, and a second electrode thereof may be connected to the second electrode of the storage capacitor Cst. The transistor T2 may be referred to as a scan transistor.

A first electrode of the storage capacitor Cst may be connected to the first power line ELVDDL, and the second electrode thereof may be connected to the gate electrode of the transistor T1.

The anode of the light emitting diode LD may be connected to the second electrode of the transistor T1, and a cathode thereof may be connected to a second power line ELVSSL. During a light emitting period of the light emitting diode LD, a first power voltage applied to the first power line ELVDDL may be greater than a second power voltage applied to the second power line ELVSSL.

Although the transistors T1 and T2 are illustrated as P-type transistors, those skilled in the art may replace at least one of the transistors with a N-type transistor by inverting a polarity of a signal.

When a scan signal of a turn-on level is applied to the i-th scan line SLi, the transistor T2 may be turned on. In this case, a data voltage charged in the j-th data line DLj may be stored in the second electrode of the storage capacitor Cst. The transistor T1 may allow a driving current to flow in response to a gate-source voltage difference maintained by the storage capacitor Cst. The driving current may flow through a path of the first power line ELVDDL, the transistor T1, the light emitting diode LD, and the second power line ELVSSL. The light emitting diode LD may emit light with luminance corresponding to an amount of the driving current.

Figure 4:
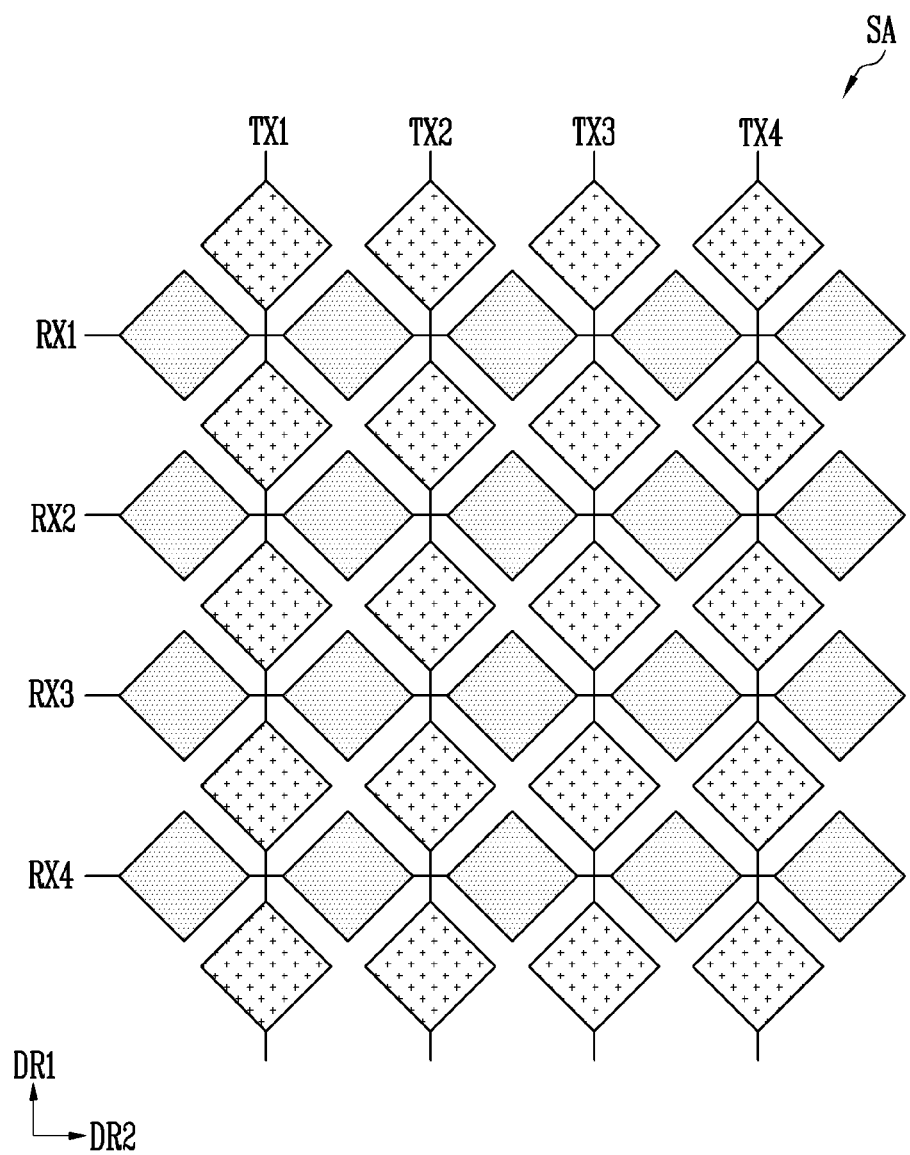
FIG. 4 illustrates a schematic view of first sensors and second sensors according to an embodiment.

FIG. 4 illustrates a schematic view of first sensors and second sensors according to an embodiment.

Referring to FIG. 4, first sensors TX1, TX2, TX3, and TX4 and second sensors RX1, RX2, RX3, and RX4 disposed in the sensing area SA are illustrated as an example. For better understanding and ease of description, it is assumed that four first sensors TX1 to TX4 and four second sensors RX1 to RX4 are disposed in the sensing area SA, but embodiments are not limited thereto.

Since the description of the first sensors TX1 to TX4 and the second sensors RX1 to RX4 is the same as the description of the first sensors TX and the second sensors RX of FIG. 1, a duplicate description will be omitted.

Figure 5:
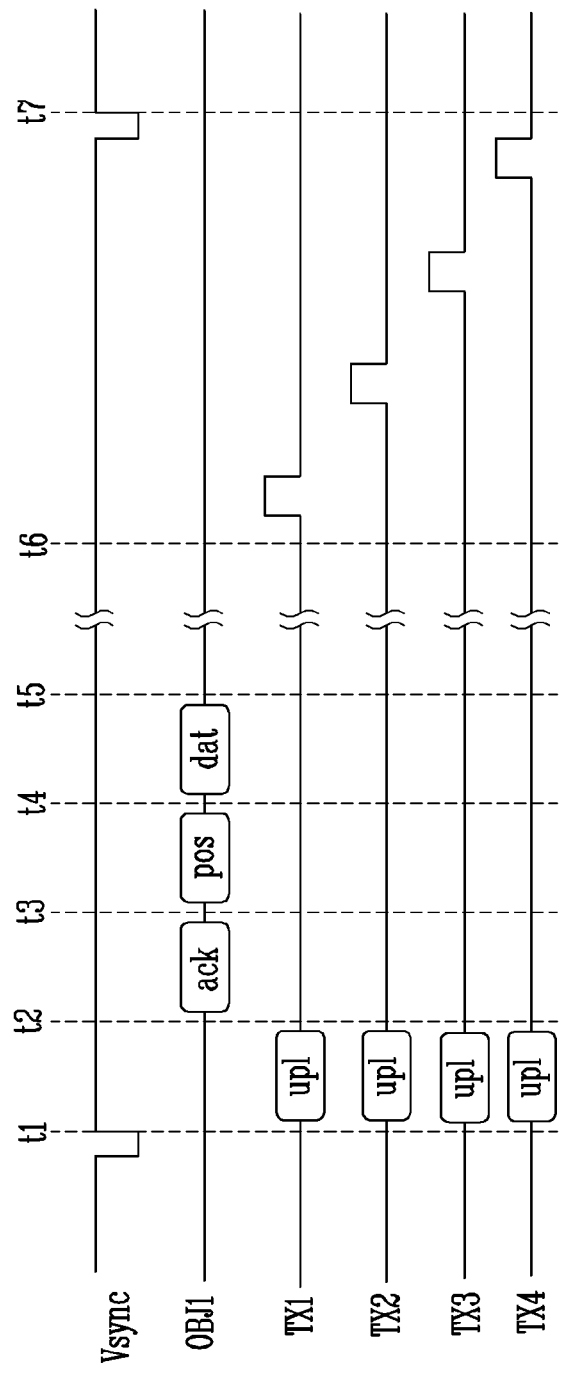
FIGS. 5, 6, and 7 illustrate schematic views of a first object sensing period and a second object sensing period according to some embodiments.
Figure 6:
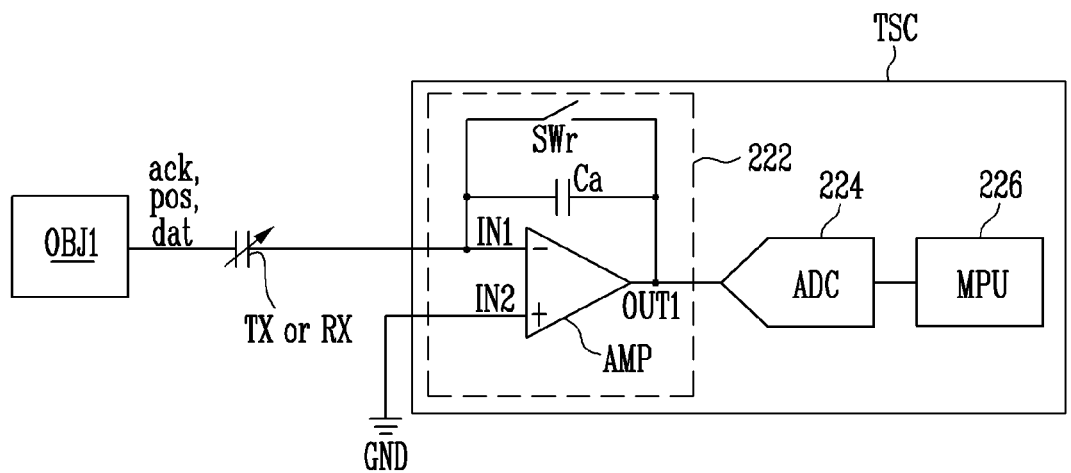
Figure 7:
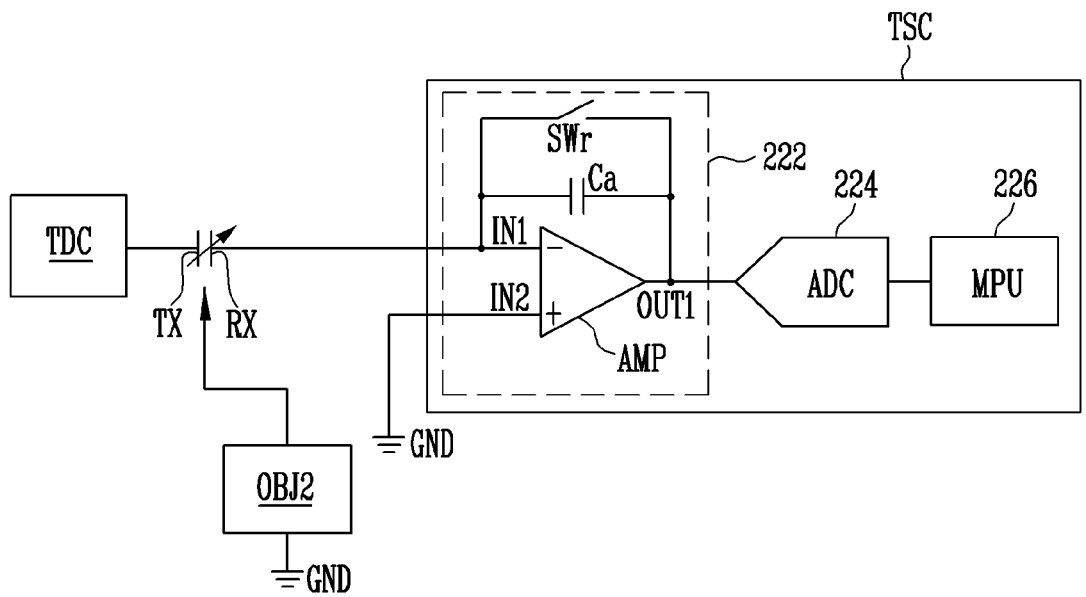

FIGS. 5 to 7 illustrate schematic views of a first object sensing period and a second object sensing period according to some embodiments.

Referring to FIG. 5, one frame period (t1-t7) corresponding to one cycle of a vertical synchronization signal Vsync is shown as an example. Here, the frame period means an image display unit (e.g., a display frame period) of the display part 110.

For example, one frame period (t1-t7) may include a first object sensing period (t1-t5) and a second object sensing period (t6-t7). Since signals for image display of the display part 110 are generated throughout one frame period (t1-t7), they may overlap the first object sensing period (t1-t5) and the second object sensing period (t6-t7).

In some embodiments, the frame period (t1-t7) for display, the first object sensing period (t1-t5), and the second object sensing period (t6-t7) may be independent of each other. For example, one frame period (t1-t7), a plurality of first object sensing periods, and a plurality of second object sensing periods may overlap. In another embodiment, one frame period (t1-t7) may not be synchronized with the first object sensing period (t1-t5) and the second object sensing period (t6-t7).

The first object sensing period (t1-t5) may be a period for sensing a first object OBJ1. The first object OBJ1 may be an active device that transmits and receives an electromagnetic signal to and from the sensor part 120. For example, the first object OBJ1 may be an active pen. In an embodiment, the display device 1 may include the first object OBJ1 so as to be detachable. In some embodiments, the display device 1 and the first object OBJ1 may be separate products.

During the period (t1-t2), the first sensors TX1, TX2, TX3, and TX4 may transmit an uplink signal upl. In an embodiment, to reduce a channel configuration cost and power consumption, during the period (t1-t2), the second sensors RX1 to RX4 may not transmit the uplink signal upl. In another embodiment, during the period (t1-t2), the second sensors RX1 to RX4 may also transmit the uplink signal upl together.

The uplink signal upl may cause interference with a data voltage through the cathode electrode of the light emitting diode LD of the pixel PXij. Accordingly, an inappropriate data voltage may be stored in the pixel PXij, and thus, display quality may be deteriorated.

When the first object OBJ1 receives the uplink signal upl, it may transmit an acknowledgment signal ack during the period (t2-t3). The acknowledgment signal ack may be a signal for notifying that the first object OBJ1 is positioned near the sensor part 120.

The first object OBJ1 may sequentially transmit a position signal pos and a data signal dat. For example, the first object OBJ1 may transmit the position signal pos during the period (t3-t4) and the data signal dat during the period (t4-t5). The position signal pos may be a signal for specifying the position of the first object OBJ1 on the sensor part 120. For example, the position signal pos may have a stronger signal strength than the acknowledgment signal ack, or may include more pulses than the acknowledgment signal ack. The data signal dat may be a signal including information (for example, button press) excluding the position of the first object OBJ1.

Each of the period (t1-t2) for transmitting the uplink signal upl, the period (t2-t3) for transmitting the acknowledgment signal ack, the period (t3-t4) for transmitting the position signal pos, and the period (t4-t5) for transmitting the data signal dat may configure a time slot. The time slot may be a time unit defined for communication between the first object OBJ1 and the sensor part 120.

Referring to FIG. 6, a configuration of the sensor part 120 for receiving the transmission signals ack, pos, and dat of the first object OBJ1 is shown as an example. In FIG. 6, configurations of the sensor part 120 and the sensor driver 220 are shown based on one sensor channel 222.

The sensor driver 220 may include a sensor receiver TSC. During the first object sensing period (t1-t5), the sensor receiver TSC may be connected to the first sensors TX or the second sensors RX.

The sensor receiver TSC may include an operational amplifier AMP, an analog digital converter 224, and a processor 226. For example, each sensor channel 222 may be implemented as an analog front end (AFE) including at least one operational amplifier AMP. The analog digital converter 224 and the processor 226 may be provided for each sensor channel 222, or may be shared by a plurality of sensor channels 222.

A first input terminal IN1 of the operational amplifier AMP may be connected to a corresponding sensor, and a second input terminal IN2 thereof may be connected to a reference power source GND. For example, the first input terminal IN1 may be an inverting terminal, and the second input terminal IN2 may be a non-inverting terminal. The reference power source GND may be a ground voltage or a voltage of a predetermined potential.

In some embodiments, the sensor channel 222 may be implemented as an integrator. In this case, a capacitor Ca and a switch SWr may be connected in parallel to each other between the first input terminal IN1 and an output terminal OUT1 of the operational amplifier AMP. For example, before receiving the transmission signals ack, pos, and dat of the first object OBJ1, the switch SWr is turned on, so that charges of the capacitor Ca may be initialized. While receiving the transmission signals ack, pos, and dat of the first object OBJ1, the switch SWr may be in a turned-off state.

The sensor channel 222 may generate an output signal corresponding to a voltage difference between the first and second input terminals IN1 and IN2. For example, the sensor channel 222 may amplify and output the difference voltage between the first and second input terminals IN1 and IN2 at a degree corresponding to a predetermined gain.

The analog digital converter 224 may be connected to the output terminal OUT1 of the operational amplifier AMP. The analog digital converter 224 converts an analog signal input from each sensor channel 222 into a digital signal. The processor 226 may analyze the digital signal to detect user input.

During the period (t2-t3), at least some of the sensors TX and RX may receive the acknowledgment signal ack with respect to the uplink signal upl. In an embodiment, to reduce channel configuration cost and power consumption, only the first sensors TX may be connected to the sensor channels 222 to receive the acknowledgment signal ack. In another embodiment, to reduce the channel configuration cost and power consumption, only the second sensors RX may be connected to the sensor channels 222 to receive the acknowledgment signal ack. In another embodiment, at least some of the first sensors TX and at least some of the second sensors RX may be connected to the sensor channels 222 to receive the acknowledgment signal ack.

During the period (t3-t4), at least some of the sensors TX and RX may receive the position signal pos. Referring to FIG. 4, the position of the first object OBJ1 for the second direction DR2 may be detected using the sensor channels 222 connected to the first sensors TX1 to TX4. In addition, the position of the first object OBJ1 for the first direction DR1 may be detected using the sensor channels 222 connected to the second sensors RX1 to RX4. In some embodiments, when the number of the sensor channels 222 is sufficient, the position of the first direction DR1 and the position of the second direction DR2 of the first object OBJ1 may be simultaneously detected. In another embodiment, when the number of the sensor channels 222 is insufficient, the position of the first direction DR1 and the position of the second direction DR2 of the first object OBJ1 may be detected in different periods.

During the period (t4-t5), at least some of the sensors TX and RX may receive the data signal dat with respect to the uplink signal upl. In some embodiments, to reduce the channel configuration cost and power consumption, only the first sensors TX may be connected to the sensor channels 222 to receive the data signal dat. In another embodiment, to reduce the channel configuration cost and power consumption, only the second sensors RX may be connected to the sensor channels 222 to receive the data signal dat. In another embodiment, at least some of the first sensors TX and at least some of the second sensors RX may be connected to the sensor channels 222 to receive the data signal dat.

Referring to FIG. 7, a configuration of the sensor part 120 for detecting a position of a second object OBJ2 during a second object sensing period (t6-t7) is shown as an example. Although a mutual-sensing type shown in association with FIG. 7, a self-sensing type may be applied in some embodiments. The second object OBJ2 may be a passive device that does not transmit and receive an electromagnetic signal to and from the sensor part 120. For example, the second object OBJ2 may be a user's finger or other portion of their body.

The sensor driver 220 may further include a sensor transmitter TDC. During the second object sensing period (t6-t7), the sensor transmitter TDC may be connected to the first sensors TX and the sensor receiver TSC may be connected to the second sensors RX.

Referring to FIG. 5, the sensor transmitter TDC may sequentially supply sensing signals to the first sensors TX1 to TX4. For example, it may supply the sensing signals to the first sensor TX1 twice (e.g., a rising transition and a falling transition), may supply the sensing signals to the first sensor TX2 twice, may supply the sensing signals to the first sensor TX3 twice, and may supply the sensing signals to the first sensor TX4 twice. The number of times the sensing signals are supplied to each of the first sensors TX1 to TX4 may be two (2) times or more in some embodiments.

The sensor receiver TSC may include a plurality of sensor channels 222 connected to a plurality of second sensors RX. Respective sensor channels 222 may receive sampling signals corresponding to sensing signals from a corresponding second sensor RX. For example, in response to a rising transition applied to the first sensor TX1, the sensor channels 222 connected to the second sensors RX1 to RX4 may independently receive the sampling signals. In addition, in response to a falling transition applied to the first sensor TX1, the sensor channels 222 connected to the second sensors RX1 to RX4 may independently receive the sampling signals.

In the sensing area SA, mutual capacitance between the first sensors TX1 to TX4 and the second sensors RX1 to RX4 may vary depending on the position of the second object OBJ2, and accordingly, the sampling signals received by the sensor channels 222 may also be different from each other. The position of the second object OBJ2 may be detected using a difference between these sampling signals.

FIGS. 8 to 12 illustrate schematic views of a first object sensing period according to some embodiments.

Hereinafter, for better understanding and ease of description, it will be described that the first sensors TX transmit the uplink signal and the second sensors RX do not transmit the uplink signal. However, in some embodiments, the second sensors RX may transmit the uplink signal, and the first sensors TX may not transmit the uplink signal. Meanwhile, at least some of the first sensors TX and at least some of the second sensors RX may transmit the uplink signal.

Figure 8:
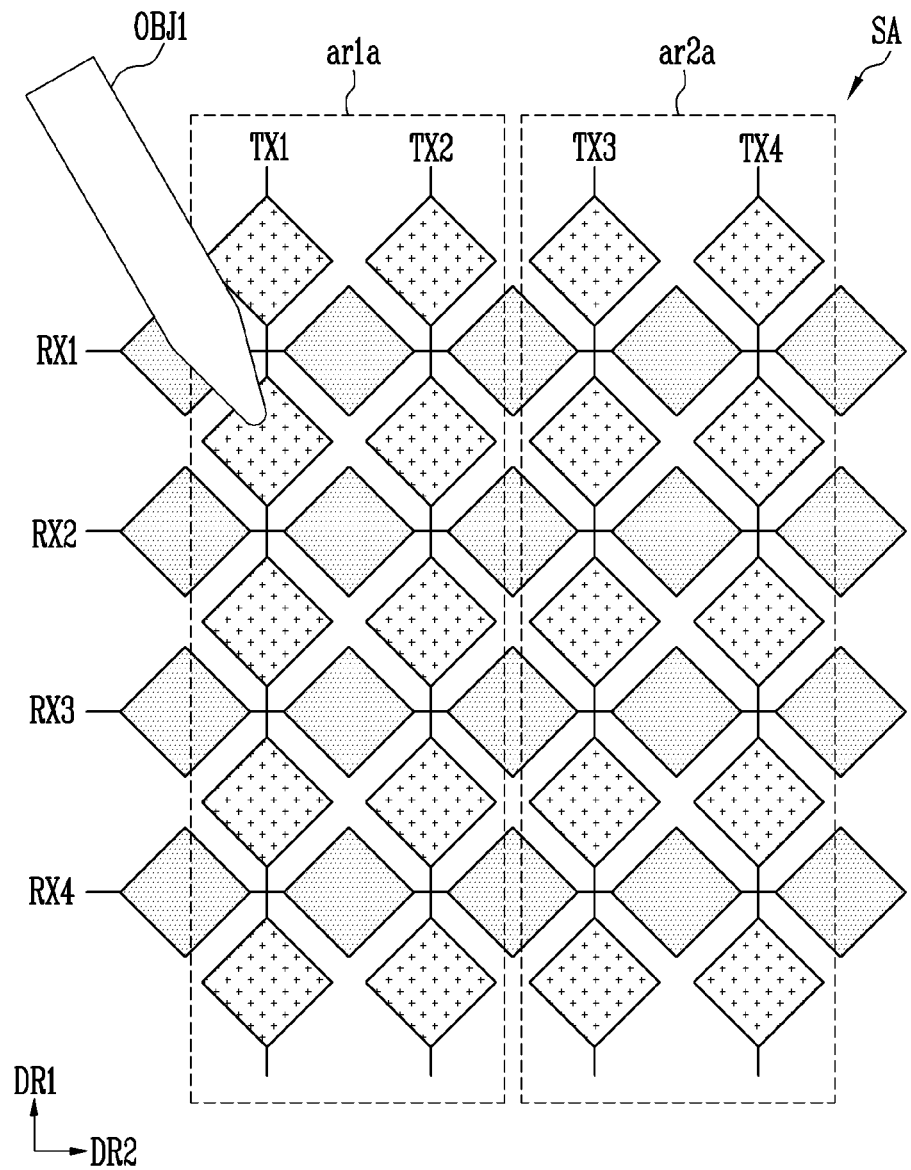
FIGS. 8, 9, 10, 11, and 12 illustrate schematic views of a first object sensing period according to some embodiments.
Figure 9:
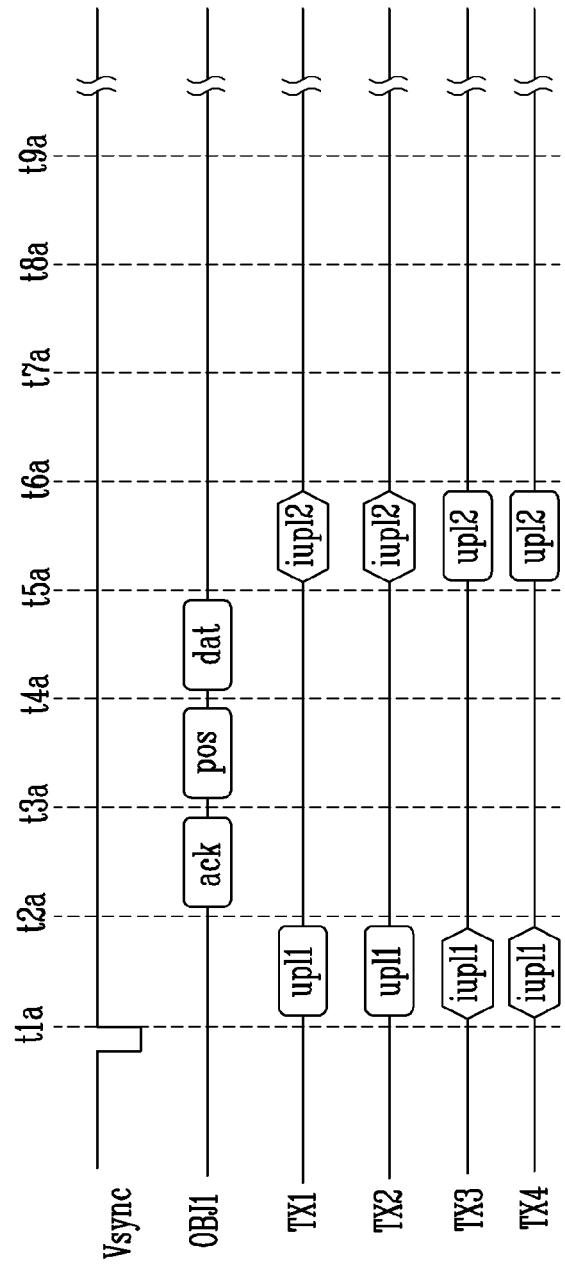

Referring to FIGS. 8 and 9, during a first period (t1a-t2a), the first sensors TX1 and TX2 of a first area ar1a of the sensor part 120 may transmit a first uplink signal upl1. In addition, during the first period (t1a-t2a), the first sensors TX3 and TX4 of a second area ar2a of the sensor part 120 may transmit a first inversion signal iupl1 with respect to the first uplink signal upl1.

During a second period (t5a-t6a) after the first period (t1a-t2a), the first sensors TX3 and TX4 of a third area ar2a of the sensor part 120 may transmit a second uplink signal upl2. In addition, during the second period (t5a-t6a), the first sensors TX1 and TX2 of a fourth area ar1a of the sensor part 120 may transmit a second inversion signal iupl2 with respect to the second uplink signal upl2. The first area ar1a may at least partially overlap the fourth area ar1a. The second area ar2a may at least partially overlap the third area ar2a. As seen in FIG. 8, the first area ar1a is the same as the fourth area ar1a, and the second area ar2a is the same as the third area ar2a.

Figure 10:
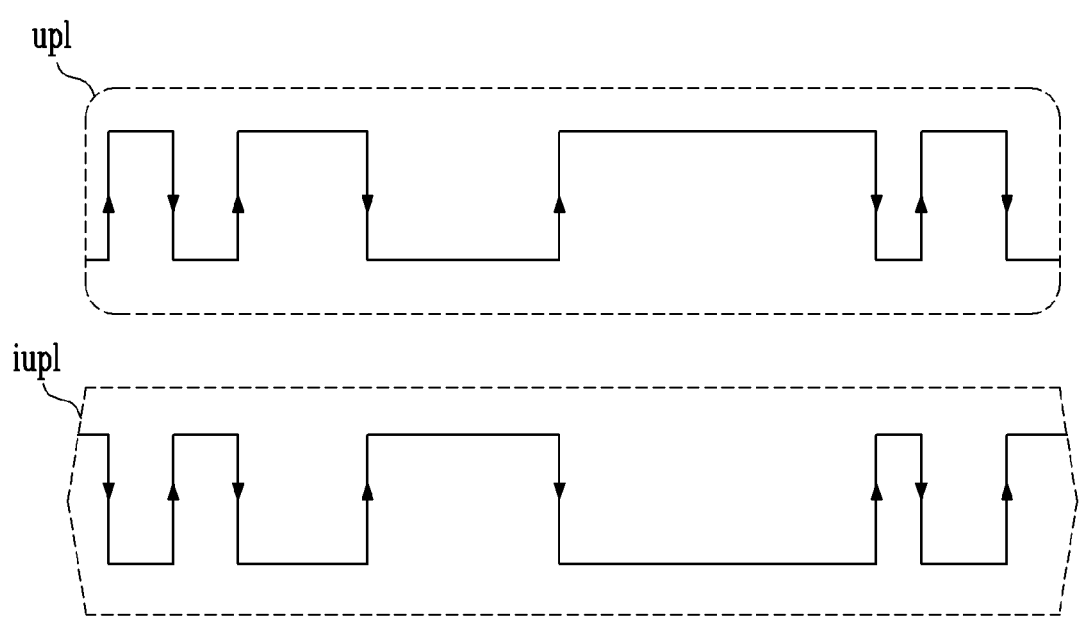

Referring to FIG. 10, a transition direction of the inversion signal iupl may be opposite to a transition direction of the corresponding uplink signal upl. For example, when the uplink signal upl is a rising transition, the inversion signal iupl may be a falling transition. For example, when the uplink signal upl is a falling transition, the inversion signal iupl may be a rising transition. Accordingly, a noise component by the first uplink signal upl1 generated in the first area ar1a during the first period (t1a-t2a) may be offset by a noise component by the first inversion signal iupl1 generated in the second area ar2a. In addition, a noise component by the second uplink signal upl2 generated in the third area ar2a during the second period (t5a-t6a) may be offset by a noise component by the second inversion signal iupl2 generated in the fourth area ar1a. Therefore, it is possible to prevent display quality from being deteriorated by the uplink signal.

The inversion signal iupl may be an out of phase signal of the uplink signal upl.

In FIGS. 8 and 9, it is assumed that the first object OBJ1 is positioned in the first area ar1a. During the first period (t1a-t2a), the first object OBJ1 may receive the first uplink signal upl1. In response to this, the first object OBJ1 may transmit an acknowledgment signal ack in a next time slot. Thus, at least some of the sensors TX and RX may receive the acknowledgment signal ack for the first uplink signal upl1 during a third period (t2a-t5a), which is between the first period (t1a-t2a) and the second period (t5a-t6a). At least some of the sensors TX and RX may further receive the position signal pos and the data signal dat during the third period (t2a-t5a).

Figure 11:
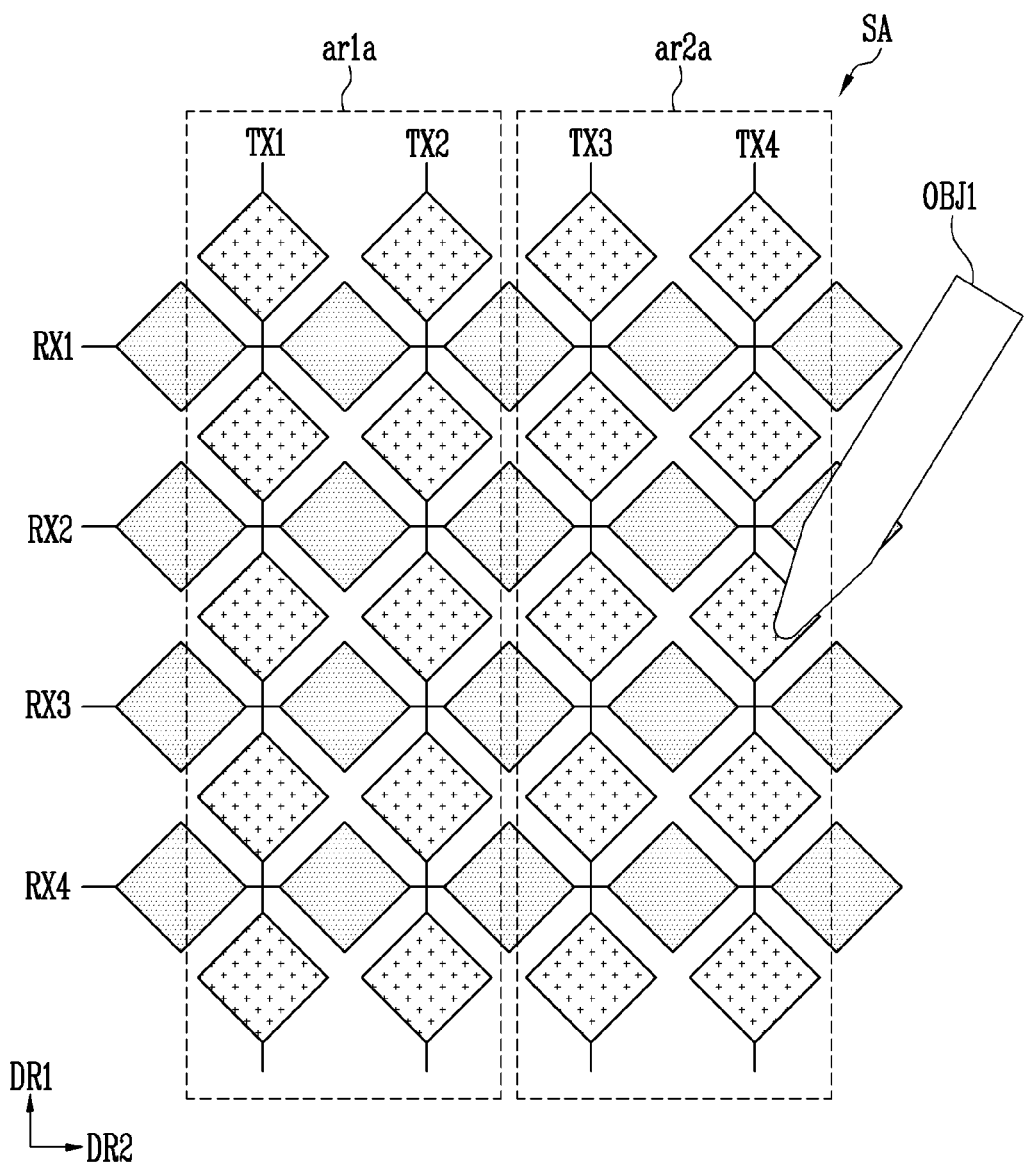
Figure 12:
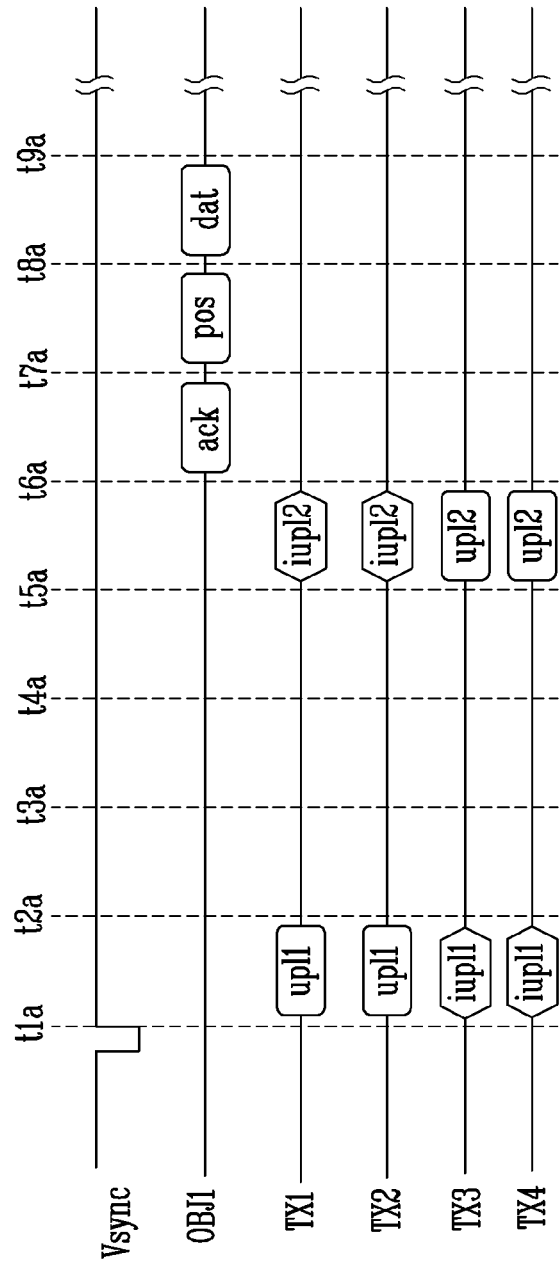

In FIGS. 11 and 12, it is assumed that the first object OBJ1 is positioned in the second area ar2a. In this case, since the first object OBJ1 does not receive the first uplink signal upl1 during the first period (t1a-t2a), the first object OBJ1 does not respond during the third period (t2a-t5a). During the second period (t5a-t6a), the first object OBJ1 may receive the second uplink signal upl2. In response to this, the first object OBJ1 may transmit an acknowledgment signal ack in a next time slot. Thus, at least some of the sensors TX and RX may receive the acknowledgment signal ack for the second uplink signal upl2 during a fourth period (t6a-t9a) after the second period (t5a-t6a). At least some of the sensors TX and RX may further receive the position signal pos and the data signal dat during the fourth period (t6a-t9a).

FIGS. 13 to 16 illustrate schematic views of a first object sensing period according to some embodiments. Hereinafter, contents overlapping those described in association with FIGS. 8 to 12 will be omitted, and the remaining contents will be described.

Figure 13:
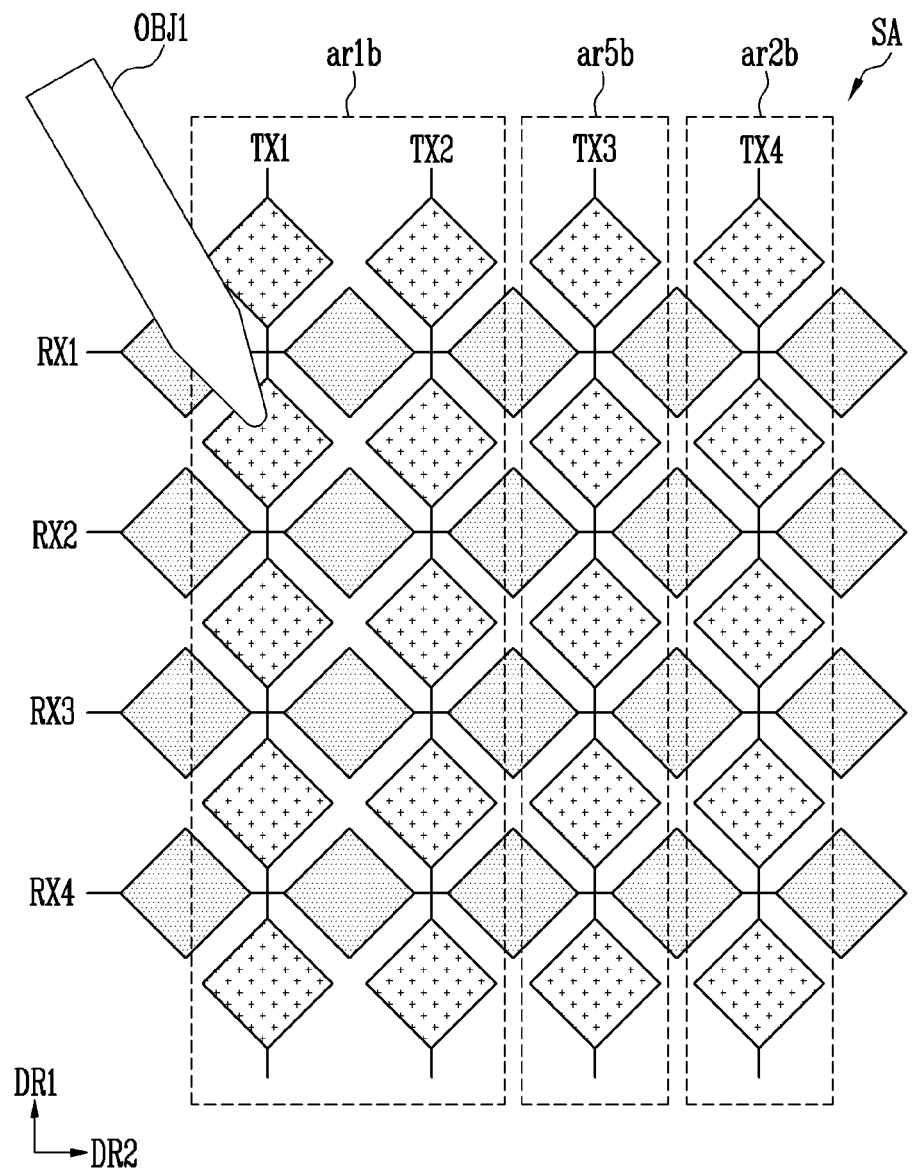
FIGS. 13, 14, 15, and 16 illustrate schematic views of a first object sensing period according to some embodiments.
Figure 14:
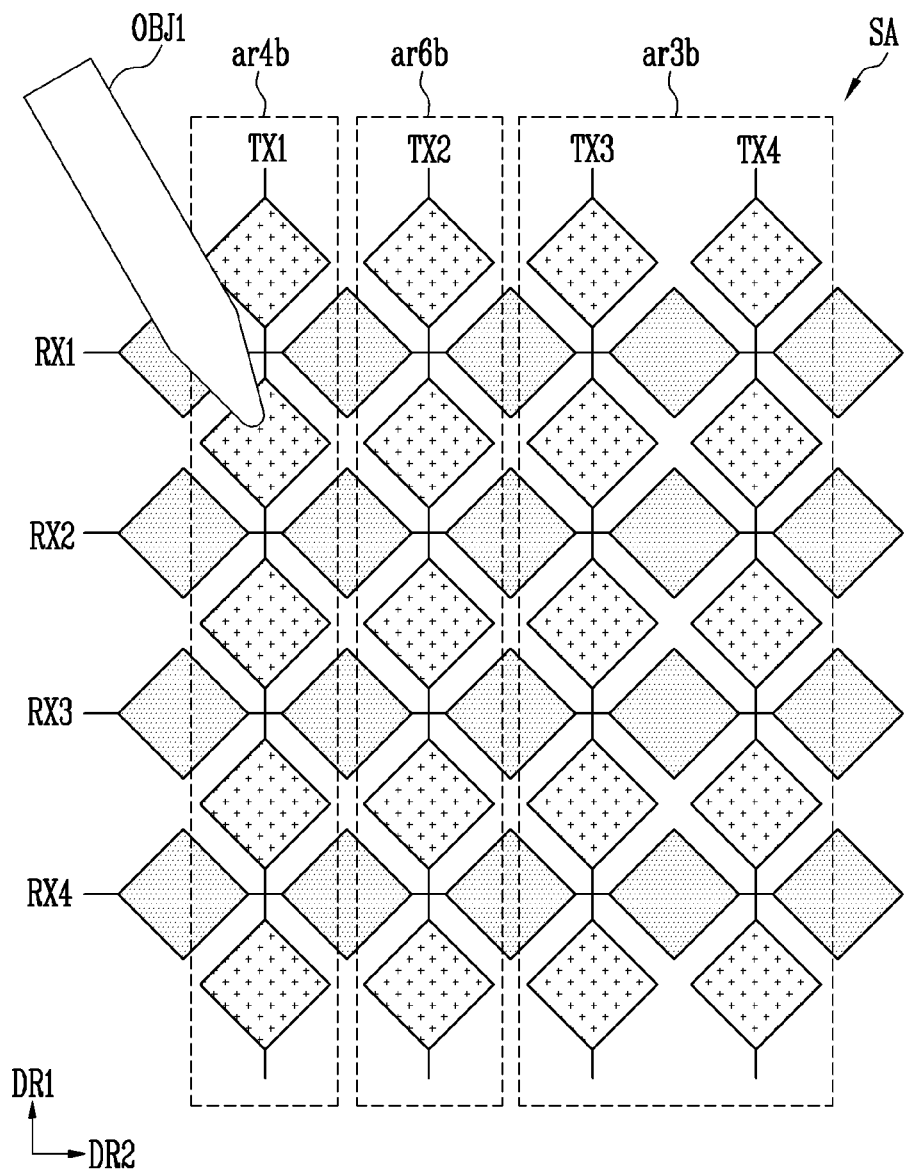
Figure 15:
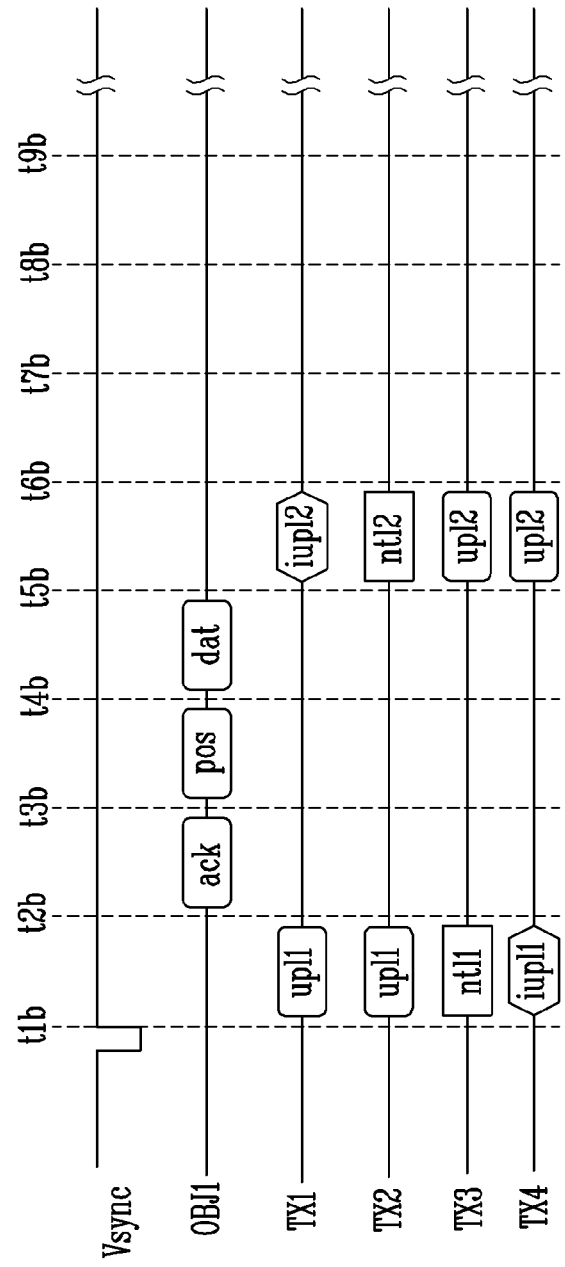

Referring to FIGS. 13 to 15, during a first period (t1b-t2b), the first sensor TX3 of a fifth area ar5b between the first area ar1b and the second area ar2b may not transmit the first uplink signal upl1 or the first inversion signal iupl1. In an embodiment, during the first period (t1b-t2b), the first sensor TX3 of the fifth area ar5b may transmit a first constant voltage signal ntl1. The first constant voltage signal ntl1 may be a signal in which a voltage level is maintained without including a transition. In an embodiment for reducing power consumption, during the first period (t1b-t2b), the first sensor TX3 of the fifth area ar5b may not transmit any signal. In FIG. 13, the fifth area ar5b is shown to include only one first sensor TX3, but in some embodiments, the fifth area ar5b may include a plurality of sensors.

During a second period (t5b-t6b), the first sensor TX2 of a sixth area ar6b between the third area ar3b and the fourth area ar4b may not transmit the second uplink signal upl2 or the second inversion signal iupl2. In an embodiment, during the second period (t5b-t6b), the first sensor TX2 of the sixth area ar6b may transmit a second constant voltage signal ntl2. The second constant voltage signal ntl2 may be a signal in which a voltage level is maintained without including a transition. In an embodiment for reducing power consumption, during the second period (t5b-t6b), the first sensor TX2 of the sixth area ar6b may not transmit any signal. In FIG. 14, the sixth area ar6b is shown to include only one first sensor TX2, but in some embodiments, the sixth area ar6b may include a plurality of sensors.

For example, in the case described in association with FIG. 8 in which the fifth area ar5b and the sixth area ar6b do not exist, when the first object OBJ1 is positioned at a boundary between the first area ar1a and the second area ar2a, the first object OBJ1 may not recognize the uplink signal due to an offset of the uplink signal and the inversion signal. According to some embodiments, since the fifth area ar5b and the sixth area ar6b prevent the offset of the uplink signal and the inversion signal, this problem may be prevented.

In association with FIGS. 13 to 15, the first area ar1b may partially overlap the sixth area ar6b. The third area ar3b may partially overlap the fifth area ar5b. For instance, since all sensors TX1, TX2, TX3, and TX4 may transmit the uplink signal at least once, no case in which the uplink signal is not transmitted to the first object OBJ1 occurs.

In association with FIGS. 13 to 15, the fifth area ar5b and the sixth area ar6b may not overlap each other. However, in some embodiments, the fifth area ar5b and the sixth area ar6b may overlap each other.

A process of detecting the first object OBJ1 in association with FIGS. 13 to 15 is the same as that described with reference to FIGS. 8 and 9, so redundant descriptions will be omitted.

In some embodiments, a difference between the high level voltage and the low level voltage of the uplink signals upl1 and upl2 may be different from a difference between the high level voltage and the low level voltage of the inversion signals iupl1 and iupl2. For example, swing voltages of the uplink signals upl1 and upl2 may be different from swing voltages of the inversion signals iupl1 and iupl2.

For example, in the first period (t1b-t2b) of FIG. 13, the first area ar1b in which the first uplink signal upl1 occurs is wider than the second area ar2b in which the first inversion signal iupl1 occurs. In this case, noise may be effectively canceled by allowing the difference between the high level voltage and the low level voltage of the first inversion signal iupl1 to be larger than the difference between the high level voltage and the low level voltage of the first uplink signal upl1.

Similarly, in the second period (t5b-t6b) of FIG. 14, the third area ar3b in which the second uplink signal upl2 occurs is wider than the fourth area ar4b in which the second inversion signal iupl2 occurs. In this case, noise may be effectively canceled by allowing the difference between the high level voltage and the low level voltage of the second inversion signal iupl2 to be larger than the difference between the high level voltage and the low level voltage of the second uplink signal upl2. Using the different swing voltages may also be applied to an embodiment in which the constant voltage signals ntl1 and ntl2 are not used.

In embodiments described in association with FIGS. 13 to 15, the uplink signal may be generated twice per frame period. However, referring to the embodiments described in association with FIG. 16, the uplink signal may be generated three or more times per frame period. A first sensor TX5 may be the closest first sensor positioned in the second direction DR2 from the first sensor TX4.

Figure 16:
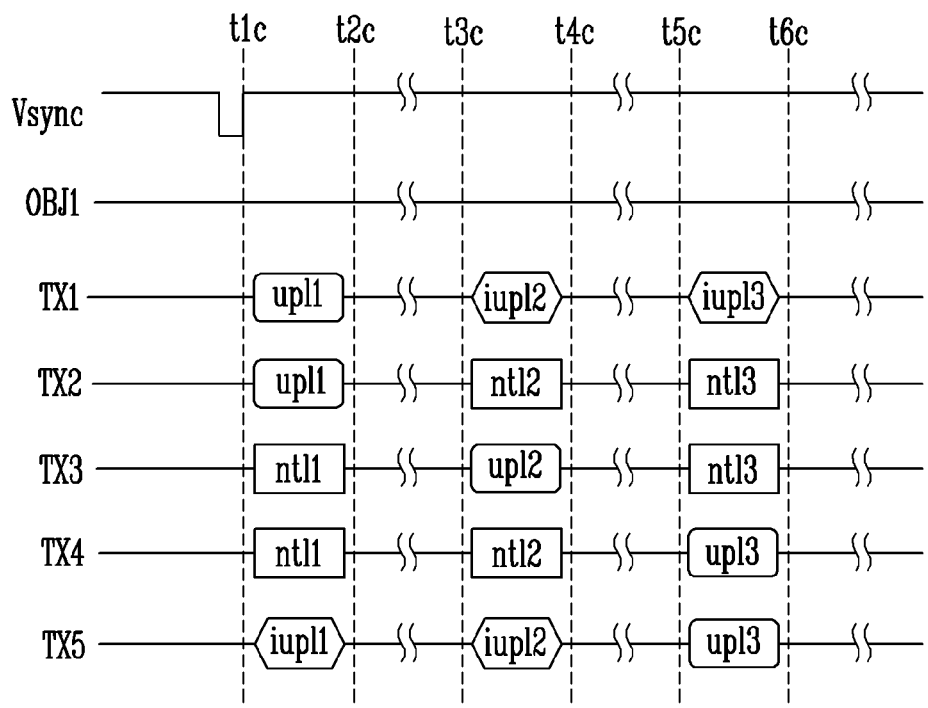

Referring to FIG. 16, during a period (t1c-t2c), the first sensor TX1 and the first sensor TX2 may transmit the first uplink signal upl1, the first sensor TX5 may transmit the first inversion signal iupl1, and the first sensors TX3 and TX4 between the first sensor TX2 and the first sensor TX5 may transmit the first constant voltage signal ntl1.

During a period (t3c-t4c), the first sensor TX3 may transmit the second uplink signal upl2, the first sensor TX1 and the first sensor TX5 may transmit the second inversion signal iupl2, and the first sensor TX2 and the first sensor TX4 may transmit the second constant voltage signal ntl2.

During a period (t5c-t6c), the first sensor TX4 and the first sensor TX5 may transmit a third uplink signal upl3, the first sensor TX1 may transmit a third inversion signal iupl3, the first sensors TX2 and TX3 between the first sensor TX1 and the first sensor TX4 may transmit a third constant voltage signal ntl3.

Even according to the embodiments described in association with FIG. 16, since all first sensors TX1, TX2, TX3, and TX4 may transmit the uplink signal at least once, no case in which the uplink signal is not transmitted to the first object OBJ1 occur. In addition, according to some embodiments, since the area transmitting the constant voltage signal prevents the uplink signal and the inversion signal from being offset, the above-described unrecognized problem of the uplink signal may be prevented.

Figure 18:
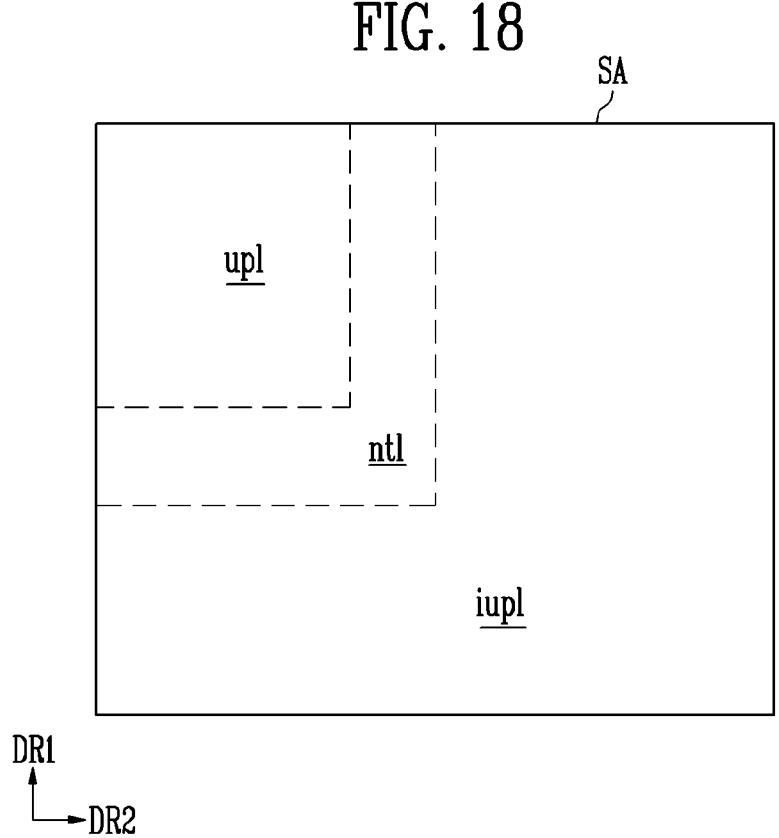
Figure 19:
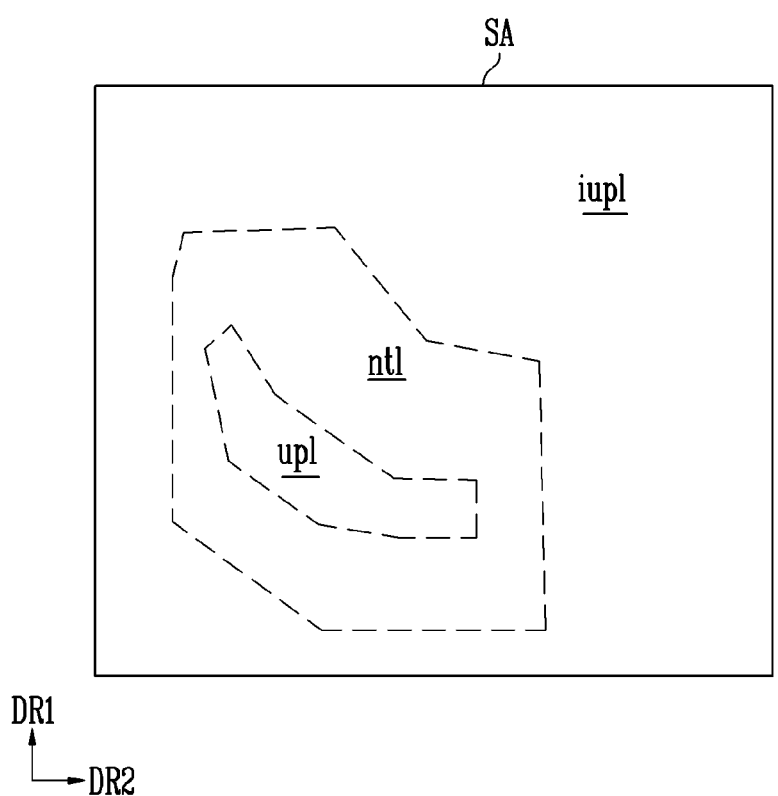

FIGS. 17 to 19 illustrate schematic views in which areas of a sensing part are variously set according to some embodiments.

In the embodiments described in association with FIGS. 8 to 16, since it is assumed that the uplink signal is transmitted to the first sensors TX, the first to sixth areas are arranged in the second direction DR2.

Referring to FIG. 17, areas of the sensing area SA may be arranged in the first direction DR1. For example, at one point in time, a transmission area of the uplink signal upl, a transmission area of the constant voltage signal ntl, and a transmission area of the inversion signal iupl may be arranged in the first direction DR1. For example, when the embodiments described in association with FIGS. 8 to 16 are implemented using the second sensors RX instead of the first sensors TX, a structure as shown in FIG. 17 is possible.

In the embodiments associated with FIG. 18, at one point in time, a transmission area of the uplink signal upl may be set to have a quadrangular shape, a transmission area of the constant voltage signal ntl may be set to surround the transmission area of the uplink signal upl, and a transmission area of the inversion signal iupl may be set to surround the transmission area of the constant voltage signal ntl. Although the embodiment associated with FIG. 19 is similar to the embodiments associated with FIG. 18, in association with FIG. 19, transmission areas of the uplink signal upl, the constant voltage signal ntl, and the inversion signal iupl may be set to have a polygonal shape rather than a quadrangular shape. As described above, according to the structure, the connection relationship, the signal application timing of the sensors TX and RX, the areas of the above-described embodiments may be variously set.

FIGS. 20 to 23 illustrate schematic views when a protocol of a first object may be changed according to some embodiments.

In the embodiments described in association with FIGS. 5 to 16, it is assumed that the protocol of the first object OBJ1 is not changed. Referring to FIG. 12, when using the existing protocol, the first object OBJ1 may receive the second uplink signal upl2, then transmit the acknowledgment signal ack in time slots (t6a-t7a), and may transmit the position signal pos in time slots (t7a-t8a) after transmitting the acknowledgment signal ack, and then may transmit the data signal dat in time slots (t8a-t9a) after transmitting the position signal pos. As such, the number of the time slots (t1a-t9a) used in the embodiments of FIGS. 8 to 12 is eight.

Figure 20:
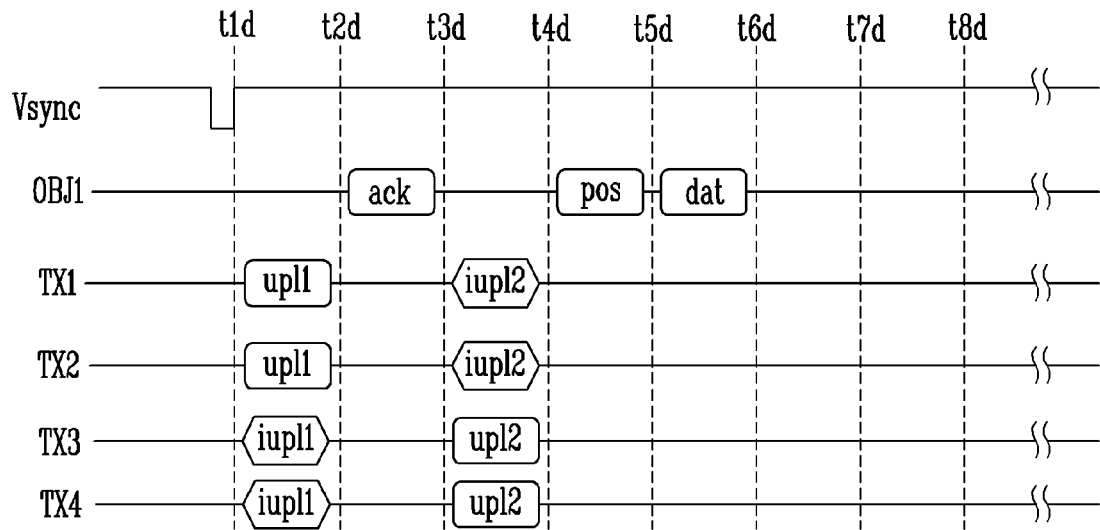
FIGS. 20, 21, 22, and 23 illustrate schematic views when a protocol of a first object may be changed according to some embodiments.
Figure 21:
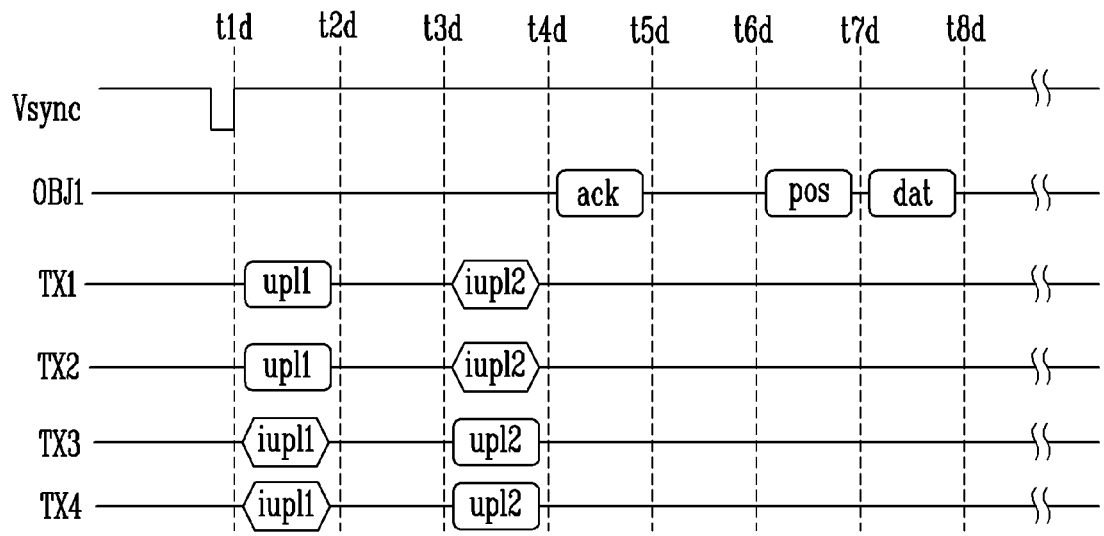

In the embodiments described in association with FIGS. 20 and 21, a case in which the protocol of the first object OBJ1 is changed so that one time slot is disposed between the transmission period of the acknowledgment signal ack and the transmission period of the position signal pos is shown. In this case, one time slot (t2d-t3d) may be disposed between the transmission period (t1d-t2d) of the first uplink signal upl1 and the transmission period (t3d-t4d) of the second uplink signal upl2.

In FIG. 20, it is assumed that the first object OBJ1 is positioned in the transmission area of the first uplink signal upl1. Referring to FIG. 20, at least some of the sensors TX and RX may receive the acknowledgment signal ack for the first uplink signal upl1 during a third period (t2d-t3d), which is between the first period (t1d-t2d) and the second period (t3d-t4d). At least some of the sensors TX and RX may further receive the position signal pos and the data signal dat during the fourth period (t4d-t8d) after the second period (t3d-t4d).

In FIG. 21, it is assumed that the first object OBJ1 is positioned in the transmission area of the second uplink signal upl2. Referring to FIG. 21, at least some of the sensors TX and RX may receive the acknowledgment signal ack for the second uplink signal upl2 during the fourth period (t4d-t8d) after the second period (t3d-t4d). At least some of the sensors TX and RX may further receive the position signal pos and the data signal dat during the fourth period (t4d-t8d).

Accordingly, in the embodiments described in association with FIGS. 20 and 21, the number of time slots (t1d-t8d) is seven. Thus, it has a merit capable of reducing one time slot than the embodiments described in association with FIGS. 8 to 12.

Figure 22:
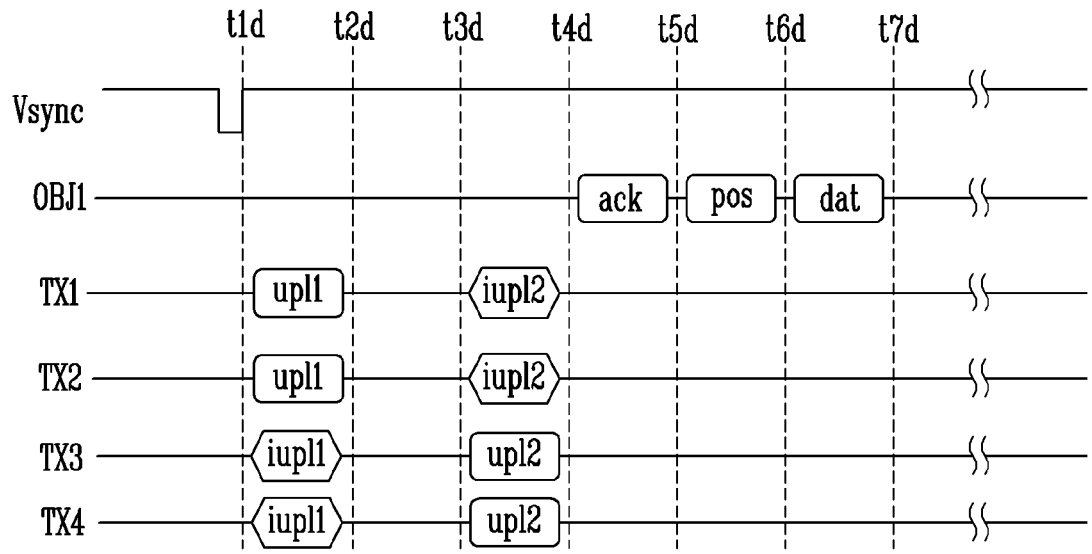

The embodiments associated with FIG. 22 may replace the embodiments described in association with FIG. 21. For example, the protocol of the first object OBJ1 for the first uplink signal upl1 and the protocol of the first object OBJ1 for the second uplink signal upl2 may be differently set. For example, for the first uplink signal upl1, the protocol of the first object OBJ1 may be changed (FIG. 20) so that one time slot (t3d-t4d) is disposed between the transmission period (t2d-t3d) of the acknowledgment signal ack and the transmission period (t4d-t5d) of the position signal pos. However, for the second uplink signal upl2, the acknowledgment signal ack and the position signal pos may be positioned in consecutive time slots (FIG. 22).

In FIG. 22, it is assumed that the first object OBJ1 is positioned in the transmission area of the second uplink signal upl2. Referring to FIG. 22, at least some of the sensors TX and RX may receive the acknowledgment signal ack for the second uplink signal upl2 during the fourth period (t4d-t7d) after the second period (t3d-t4d). At least some of the sensors TX and RX may further receive the position signal pos and the data signal dat during the fourth period (t4d-t7d).

According to the embodiments associated with FIG. 22, there is a merit capable of further reducing one time slot than the case according to the embodiments described in association with FIG. 21.

Figure 23:
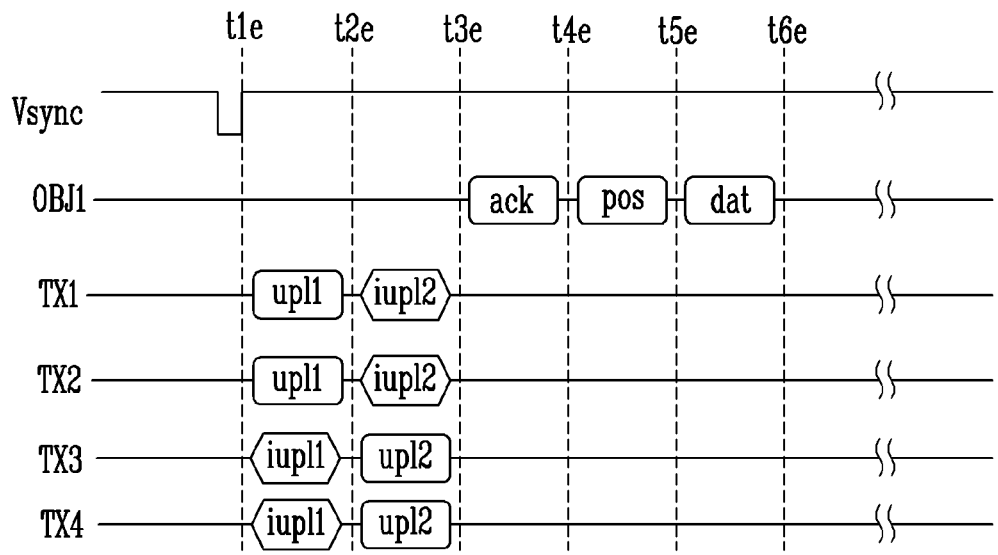
Figure 24:
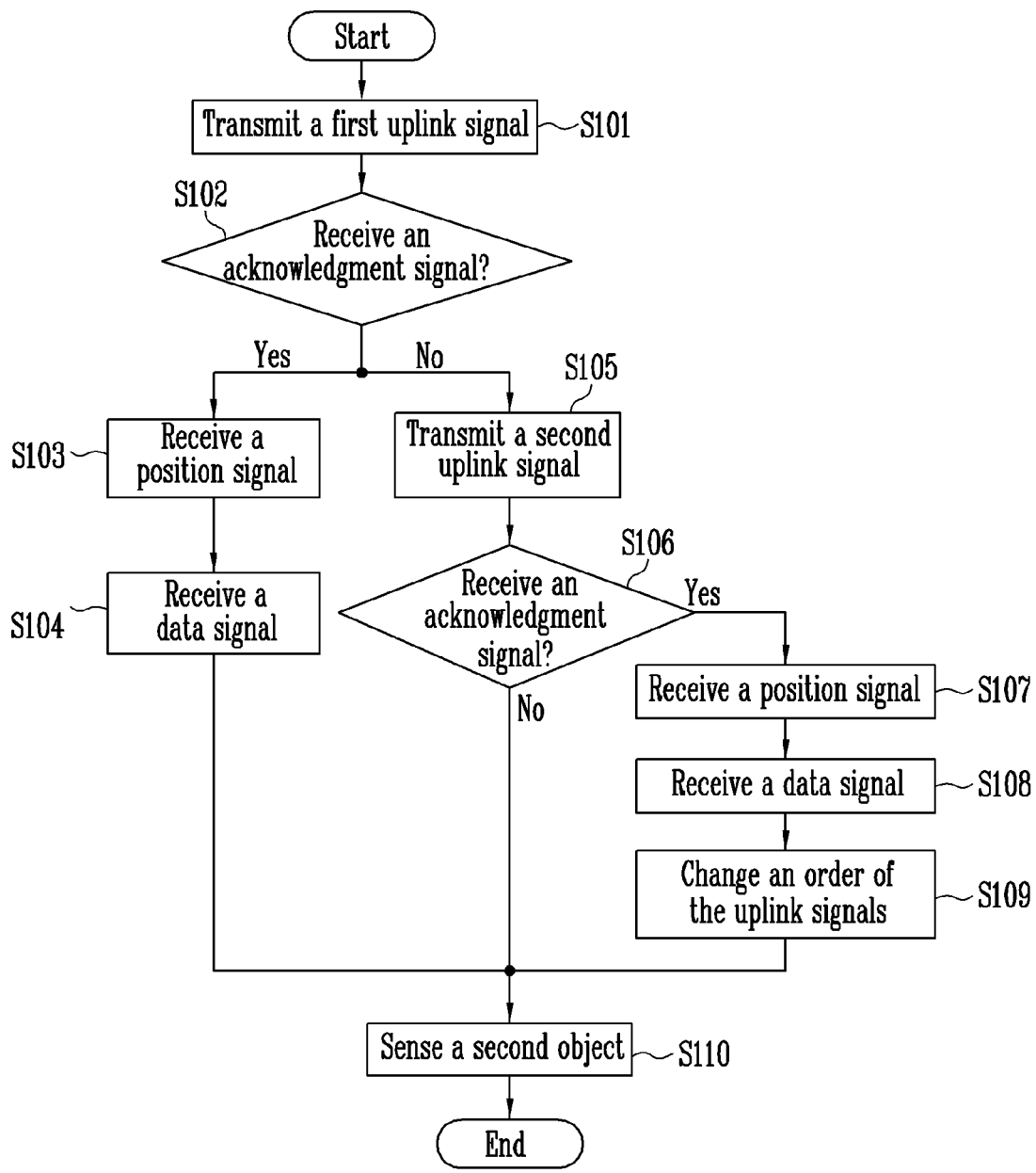
FIGS. 24, 25, 26, and 27 illustrate schematic views of a first object sensing period according to some embodiments.
Figure 25:
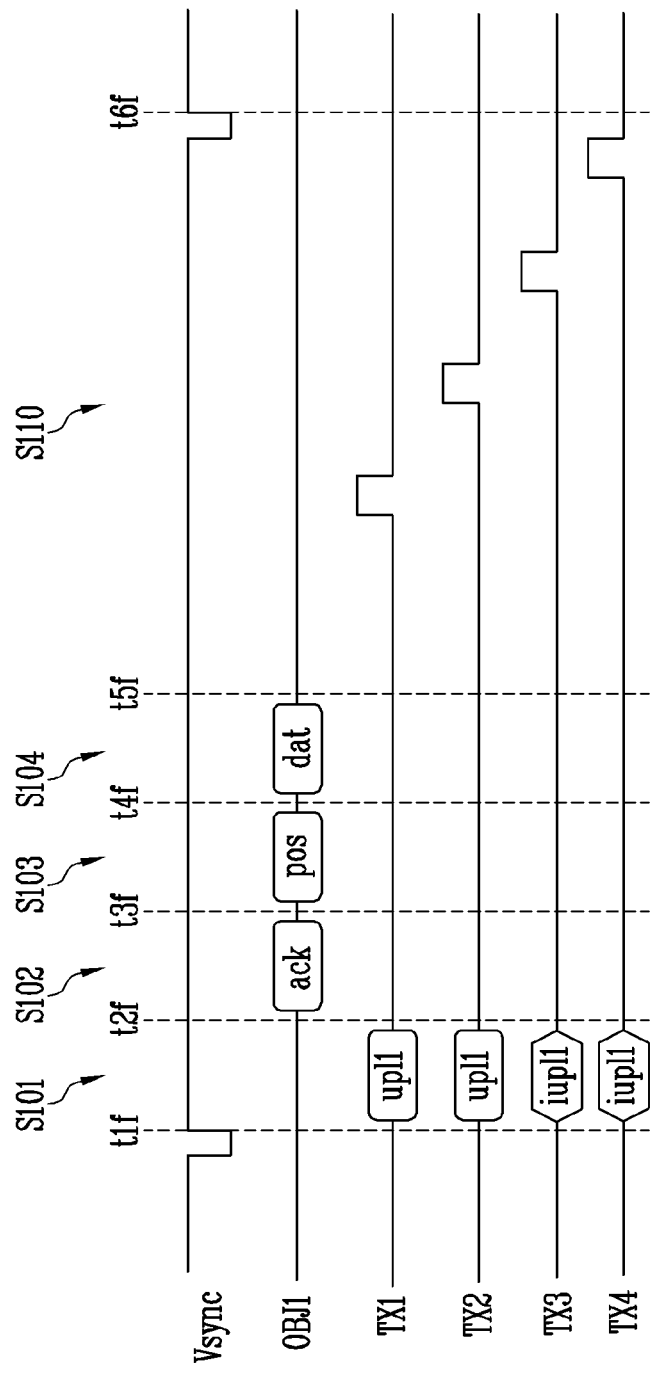

Referring to FIG. 23, which is another embodiment, at least some of the sensors TX and RX may receive the acknowledgment signal ack for the first uplink signal upl1 or the second uplink signal upl2 after the second period (t2e-t3e). At least some of the sensors TX and RX may further receive the position signal pos and the data signal dat after receiving the acknowledgment signal ack.

According to the embodiments associated with FIG. 23, the protocol of the object OBJ1 may be set so that when the first uplink signal upl1 is received, the acknowledgment signal ack may be transmitted after delaying one time slot (t2e-t3e) and when the second uplink signal upl2 is received, the acknowledgment signal ack may be transmitted without delaying the time slot. In this case, the time slots (t1e-t2e) of the first uplink signal upl1 and the time slots (t2e-t3e) of the second uplink signal upl2 may be set to be continuously positioned. According to the embodiments associated with FIG. 23, there is a merit capable of further reducing one time slot than the case according to the embodiments described in association with FIG. 22.

FIGS. 24 to 27 illustrate schematic views of a first object sensing period according to some embodiments.

During a first period (t1f-t2f), the first sensors TX1 and TX2 of the first area of the sensor part 120 may transmit the first uplink signal upl1, and the first sensors TX3 and TX4 of the second area of the sensor part 120 may transmit the first inversion signal iupl1 for the first uplink signal upl1 (S101).

When the acknowledgment signal ack for the first uplink signal upl1 is received (see FIG. 25), the second uplink signal and the second inversion signal may not be transmitted during the second period (S102). At least some of the sensors TX and RX may sequentially receive the position signal pos and the data signal dat (S103 and S104). Then, sensing of the second object OBJ2 may be performed (S110).

When the acknowledgment signal ack for the first uplink signal upl1 is not received (see FIG. 26), during a second period (t5g-t6g) after a first period (t1g-t2g), the first sensors TX3 and TX4 of the third area of the sensor part 120 may transmit the second uplink signal upl2, and the first sensors TX1 and TX2 of the fourth area of the sensor part 120 may transmit the second inversion signal iupl2 for the second uplink signal upl2 (S105). In this case, the first area may at least partially overlap the fourth area, and the second area may at least partially overlap the third area.

Figure 26:
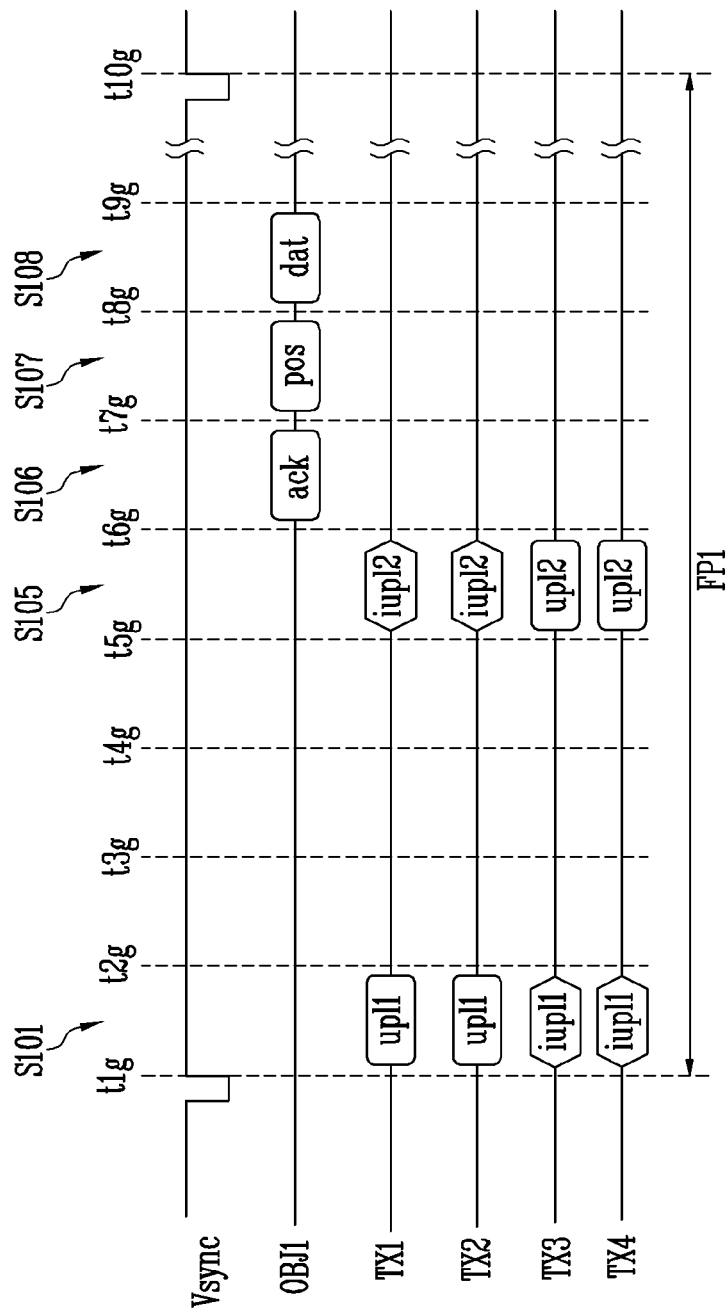
Figure 27:
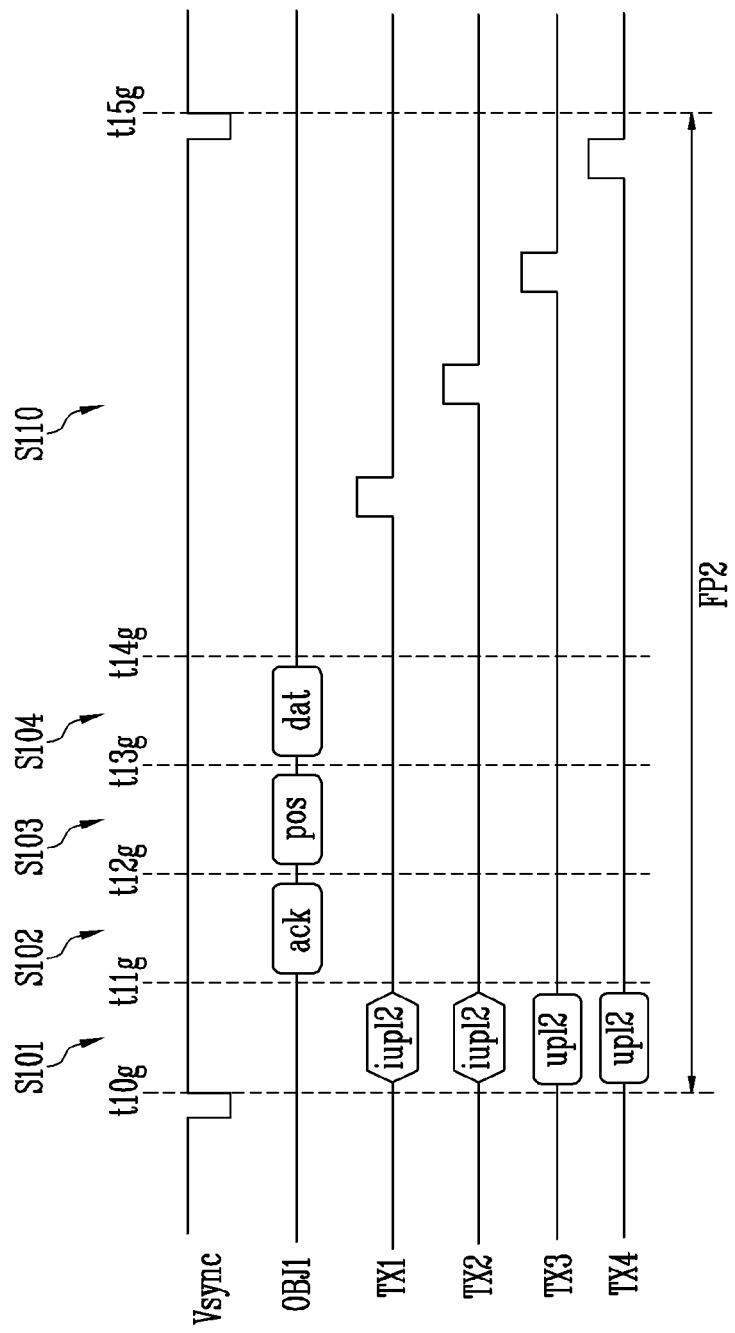

When the acknowledgment signal ack for the second uplink signal upl2 is received (S106), the position signal pos and the data signal dat may be sequentially received (S107 and S108). When the acknowledgment signal ack for the second uplink signal upl2 is received, a subsequent uplink signal may be determined as a second uplink signal. For instance, the order of the uplink signals may be changed (S109). For example, in a first frame period FP1, the first uplink signal upl1 is transmitted during the first period (t1g-t2g) and the second uplink signal upl2 is transmitted during the second period (t5g-t6g), and in this case, the acknowledgment signal ack may be generated in response to the second uplink signal upl2 (FIG. 26). In this case, in a second frame period FP2 following the first frame period FP1, the second uplink signal upl2 may be transmitted in a first period (t10g-t11g). Thus, when the acknowledgment signal ack is generated in a period (t11g-t12g), it is not necessary to generate the first uplink signal during the second frame period FP2 (FIG. 27).

According to some embodiments, since only a minimum uplink signal may be transmitted in each frame period, there is a merit that the time slot may be further reduced. The embodiments described in association with FIGS. 24 to 27 may be selectively combined with the embodiments described in association with FIGS. 5 to 23.

Figure 28:
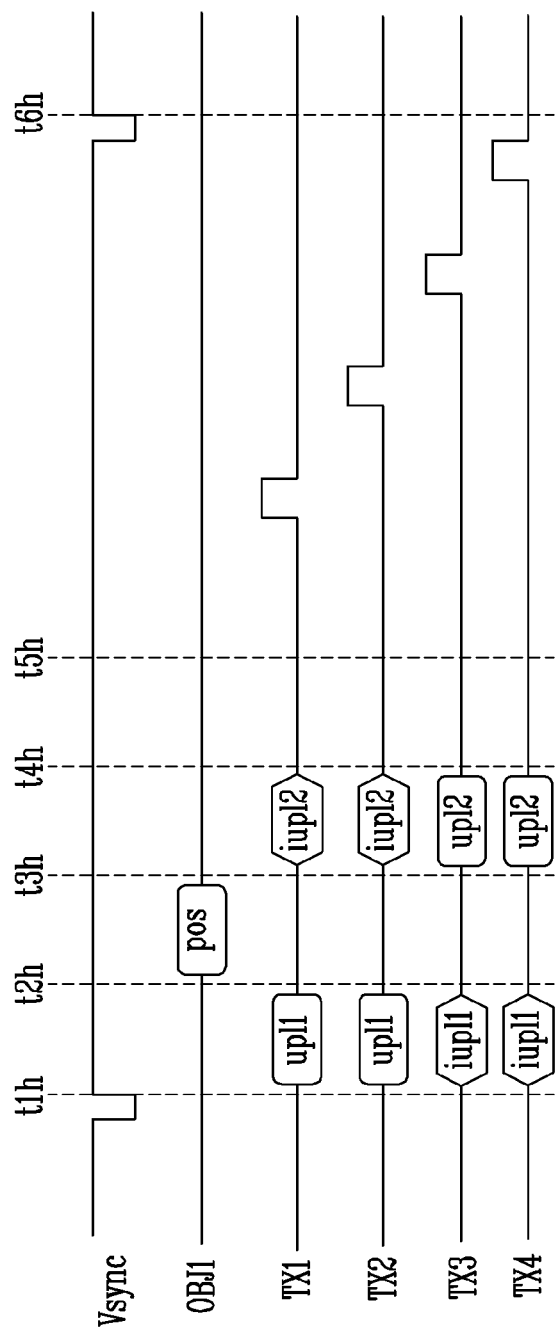
FIG. 28 illustrates a schematic view for explaining that embodiments may be applied to various types of first objects.

FIG. 28 illustrates a schematic view for explaining that embodiments may be applied to various types of first objects.

In the embodiments so far, the first object OBJ1 that sequentially generates the acknowledgment signal ack, the position signal pos, and the data signal dat has been described as a reference.

In the embodiments associated with FIG. 28, the first object OBJ1 may communicate with the display device 1 using other wireless communication, such as Bluetooth. In this case, since data transmission and reception corresponding to the acknowledgment signal ack and the data signal dat is performed using Bluetooth or the like, it may be sufficient for the first object OBJ1 to generate only the position signal pos for the sensor part 120.

As shown in FIG. 28, it is possible to prevent display quality from being deteriorated due, at least in part, to transmission of the uplink signal, by transmitting the inversion signals iupl1 and iupl2 even corresponding to the first object OBJ1 that generates only the position signal pos. As such, the above-described embodiments associated with FIGS. 5 to 27 may also be applied to the embodiments associated with FIG. 28.

Although certain embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A display device comprising:
a display part; and
a sensor part overlapping the display part,
wherein:
during a first period, sensors in a first area of the sensor part are configured to transmit a first uplink signal;
during the first period, sensors in a second area of the sensor part are configured to transmit a first inversion signal with respect to the first uplink signal;
during a second period after the first period, sensors in a third area of the sensor part are configured to transmit a second uplink signal;
during the second period, sensors in a fourth area of the sensor part are configured to transmit a second inversion signal with respect to the second uplink signal;
the first area at least partially overlaps the fourth area; and
the second area at least partially overlaps the third area.

2. The display device of claim 1, wherein:
a transition direction of the first inversion signal is opposite a transition direction of the first uplink signal; and
a transition direction of the second inversion signal is opposite a transition direction of the second uplink signal.

3. The display device of claim 1, wherein at least some of the sensors are configured to receive an acknowledgment signal for the first uplink signal during a third period between the first period and the second period.

4. The display device of claim 3, wherein at least some of the sensors are further configured to receive a position signal and a data signal during the third period.

5. The display device of claim 3, wherein at least some of the sensors are further configured to receive a position signal and a data signal during a fourth period after the second period.

6. The display device of claim 1, wherein at least some of the sensors are configured to receive an acknowledgment signal for the second uplink signal during a fourth period after the second period.

7. The display device of claim 6, wherein at least some of the sensors are further configured to receive a position signal and a data signal during the fourth period.

8. The display device of claim 1, wherein at least some of the sensors are configured to receive an acknowledgment signal for the first uplink signal or the second uplink signal after the second period.

9. The display device of claim 8, wherein at least some of the sensors are further configured to receive a position signal and a data signal after receiving the acknowledgment signal.

10. The display device of claim 1, wherein:
during the first period, sensors in a fifth area between the first area and the second area are configured not to transmit ether of the first uplink signal and the first inversion signal; and
during the second period, sensors in a sixth area between the third area and the fourth area are configured not to transmit either of the second uplink signal and the second inversion signal.

11. The display device of claim 10, wherein:
the first area partially overlaps the sixth area; and
the third area partially overlaps the fifth area.

12. The display device of claim 10, wherein:
during the first period, the sensors in the fifth area are configured to transmit a first constant voltage signal; and
during the second period, the sensors in the sixth area are configured to transmit a second constant voltage signal.

13. The display device of claim 11, wherein the fifth area and the sixth area do not overlap each other.

14. A method of driving a display device comprising a display part and a sensor part overlapping the display part, the driving method comprising:
during a first period:
transmitting, by sensors in a first area of the sensor part, a first uplink signal; and
transmitting, by sensors in a second area of the sensor part, a first inversion signal with respect to the first uplink signal; and
in response to an acknowledgment signal for the first uplink signal not being received, during a second period after the first period:
transmitting, by sensors in a third area of the sensor part, a second uplink signal; and
transmitting, by sensors in a fourth area of the sensor part, a second inversion signal with respect to the second uplink signal,
wherein the first area at least partially overlaps the fourth area, and
wherein the second area at least partially overlaps the third area.

15. The method of driving the display device of claim 14, further comprising:

in response to an acknowledgment signal for the second uplink signal being received, determining a subsequent uplink signal as the second uplink signal.

16. The method of driving the display device of claim 15, further comprising:

in response to an acknowledgment signal for the first uplink signal being received, not transmitting the second uplink signal and the second inversion signal during the second period.

17. The method of driving the display device of claim 14, wherein:

the first area and the fourth area are the same; and
the second area and the third area are the same.

18. The method of driving the display device of claim 14, further comprising:

during the first period, not transmitting, by sensors in a fifth area between the first area and the second area, either of the first uplink signal and the first inversion signal.

19. The method of driving the display device of claim 18, further comprising:

during the second period, not transmitting, by sensors in a sixth area between the third area and the fourth area, either of the second uplink signal and the second inversion signal.

20. The method of driving the display device of claim 19, further comprising:

during the first period, transmitting, by the sensors in the fifth area, a first constant voltage signal; and
during the third period, transmitting, by the sensors in the sixth area, a second constant voltage signal.

\* \* \* \* \*